United States Patent
Watanabe et al.

[11] Patent Number: 5,926,618
[45] Date of Patent: Jul. 20, 1999

[54] CHARACTER INFORMATION PROCESSOR FOR PRINTING CHARACTERS

[75] Inventors: Kenji Watanabe; Takanobu Kameda; Chieko Aida; Tomoyuki Shimmura, all of Tokyo; Yoshiya Toyosawa, Suwa; Hiroyasu Kurashina, Suwa; Takeshi Hosokawa, Suwa, all of Japan

[73] Assignees: King Jim Co., Ltd.; Seiko Epson Corporation, both of Japan

[21] Appl. No.: 08/942,126

[22] Filed: Oct. 1, 1997

Related U.S. Application Data

[62] Division of application No. 08/831,217, Apr. 2, 1997, which is a division of application No. 08/568,448, Dec. 7, 1995, Pat. No. 5,680,520.

[51] Int. Cl.$^6$ .................................................. G06K 15/00
[52] U.S. Cl. .......................................... 395/110; 395/102
[58] Field of Search .................................... 395/101, 110, 395/112, 102, 117; 400/1–4, 9, 61, 62, 63, 67, 70, 72; 358/470

[56] References Cited

U.S. PATENT DOCUMENTS

| | | | |
|---|---|---|---|
| 5,382,100 | 1/1995 | Sakungai et al. | 400/9 |
| 5,604,853 | 2/1997 | Nagashima | 395/803 |

FOREIGN PATENT DOCUMENTS

| | | |
|---|---|---|
| 0272821 | 6/1988 | European Pat. Off. |
| 0573751 | 12/1993 | European Pat. Off. |
| 58-195235 | 11/1983 | Japan |
| 358899 | 3/1991 | Japan |
| 5298294 | 11/1993 | Japan |
| 9409438 | 4/1994 | WIPO |

OTHER PUBLICATIONS

"Typesetting", *The Way Things Work* Simon and Schuster, New York, 1967, pp. 410–415.
"Smith Cororna Owner's Manual", Smith Corona Corp., 1990, pp. 2 and 13.
"WordPerfect Reference", WorkPerfect Corporation, 1993, pp. 71–74, 147–175, 702–708, 735–737 and 754.
"type and typesetting", *Grolier Electronic Publishing, Inc.,* 1995.
"Gutenberg, Johann", *Grolier Electronic Publishing, Inc.,* 1995.
Patent Abstracts of Japan, vol. 17, No. 194, Apr. 15, 1993.

*Primary Examiner*—Arthur G. Evans
*Attorney, Agent, or Firm*—George A. Loud; Lorusso & Loud

[57] ABSTRACT

A character information processor which can be applied to a tape printing device. The character information processor is provided with a read-only memory in which a table containing the levels of alternatives of a menu hierarchical structure set correspondingly to each edition function is stored. When an edition level is selected by an operator by keying, only edition operations, which are available at the selected edition level, are displayed on the screen of a display unit as choices. An example of the function of editing a character string is a function for enabling the restoration of a text, on which an edition operation such as an input operation and a deleting operation has been once performed. This function is implemented by providing a restoration buffer in the processor and by storing a character or a character string, on which an operation is performed, and a cause-for-restoration parameter representing a kind of an operation in the processor each time when an operation such as an input and a deletion is performed, and by performing a restoration operation according to the cause-for-restoration parameter. Further, regarding an operation of editing a printing layout, the processor has an operation of performing a text alignment by converting a full-size space, which is inputted by keying similarly as in the case of an ordinary character, into a half-size space to be treated as a space of a size, which is half of the size of a full-size character, when printing.

10 Claims, 18 Drawing Sheets

F I G. 3
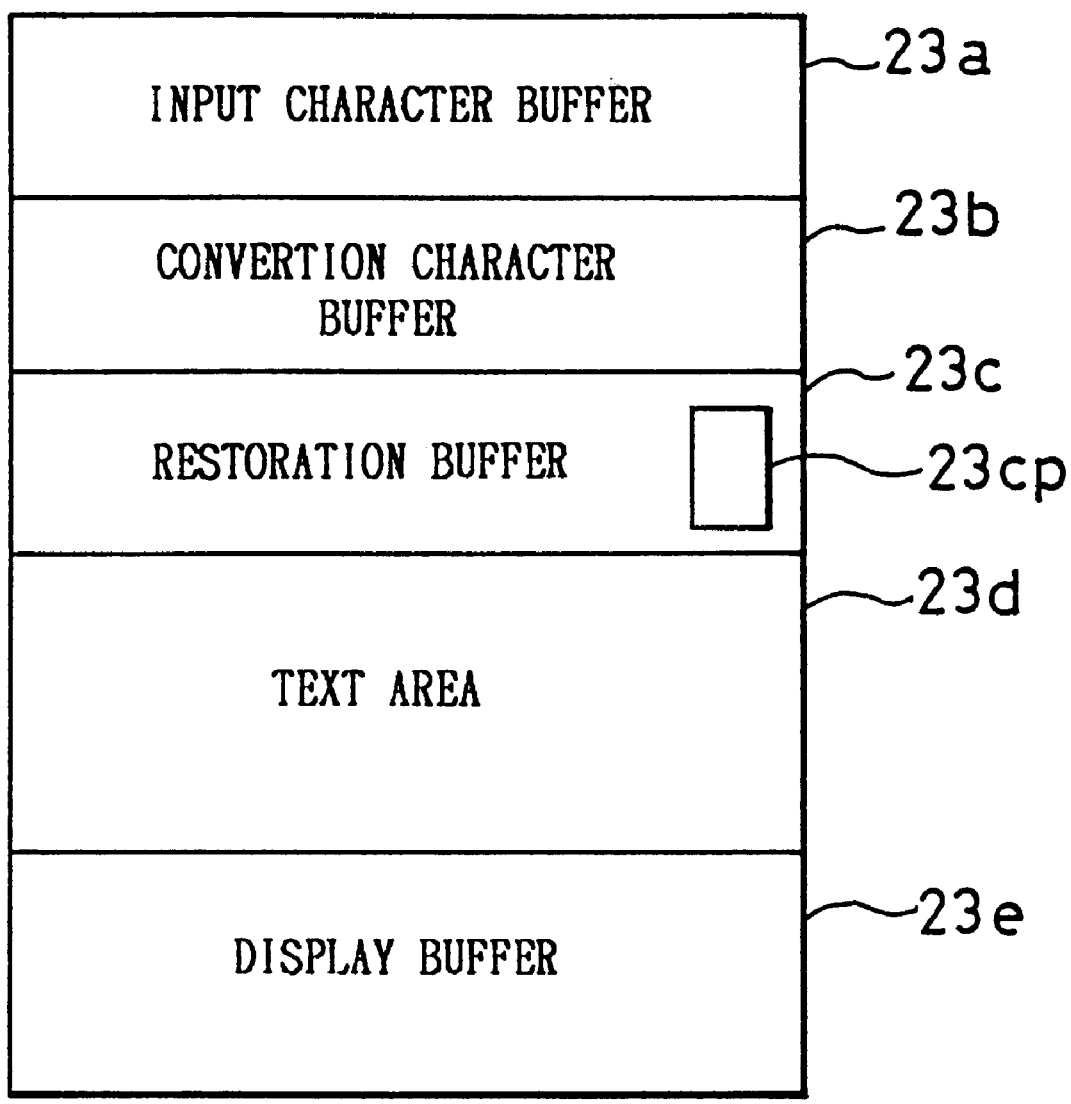

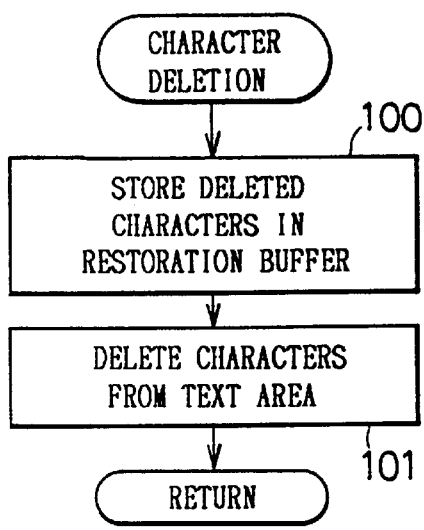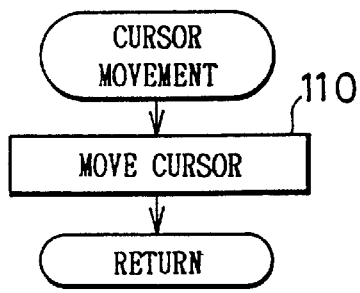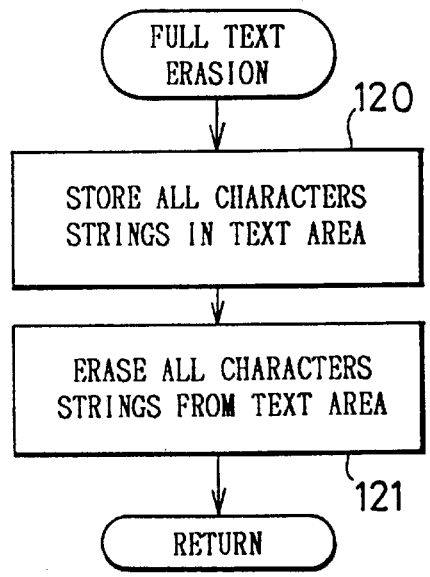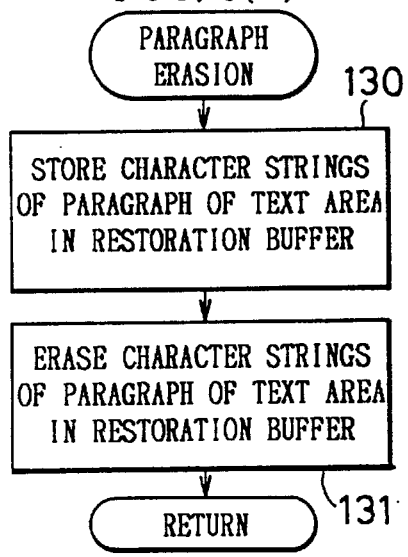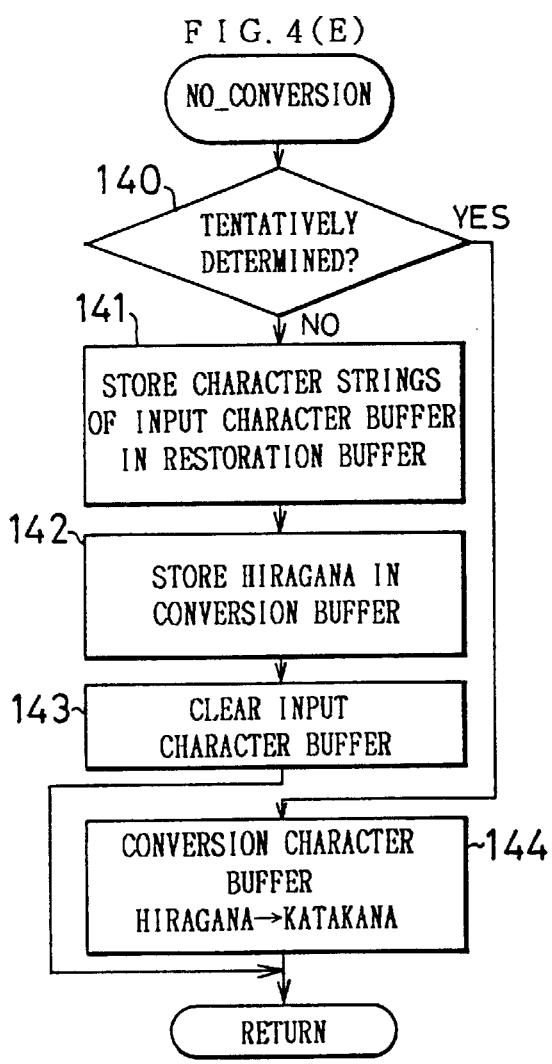

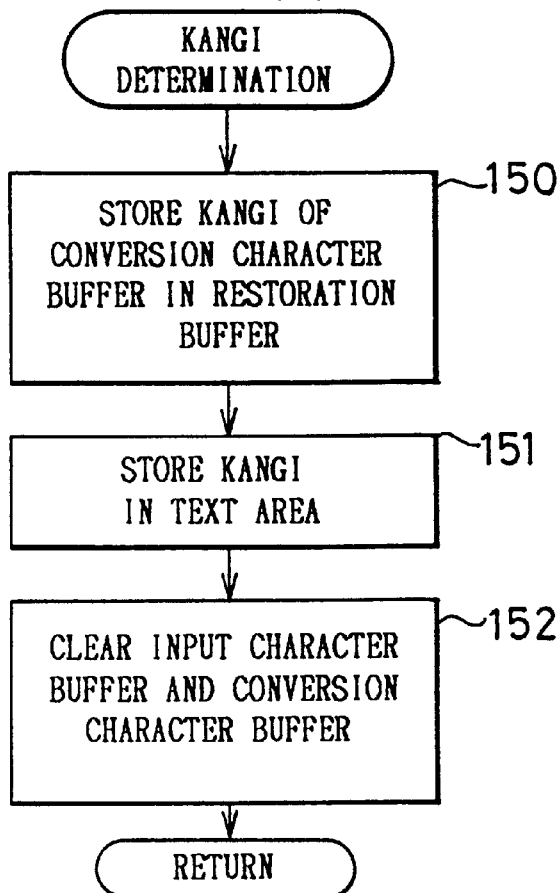
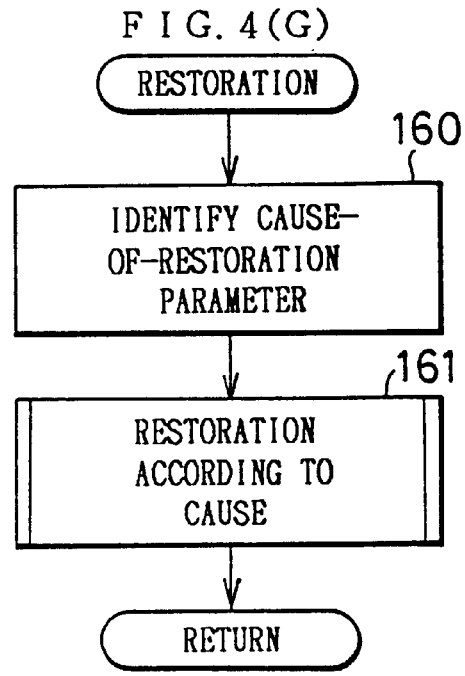
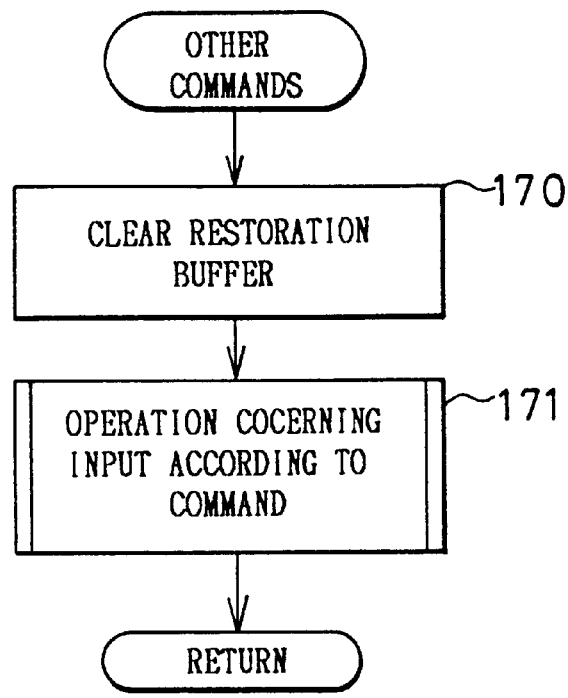

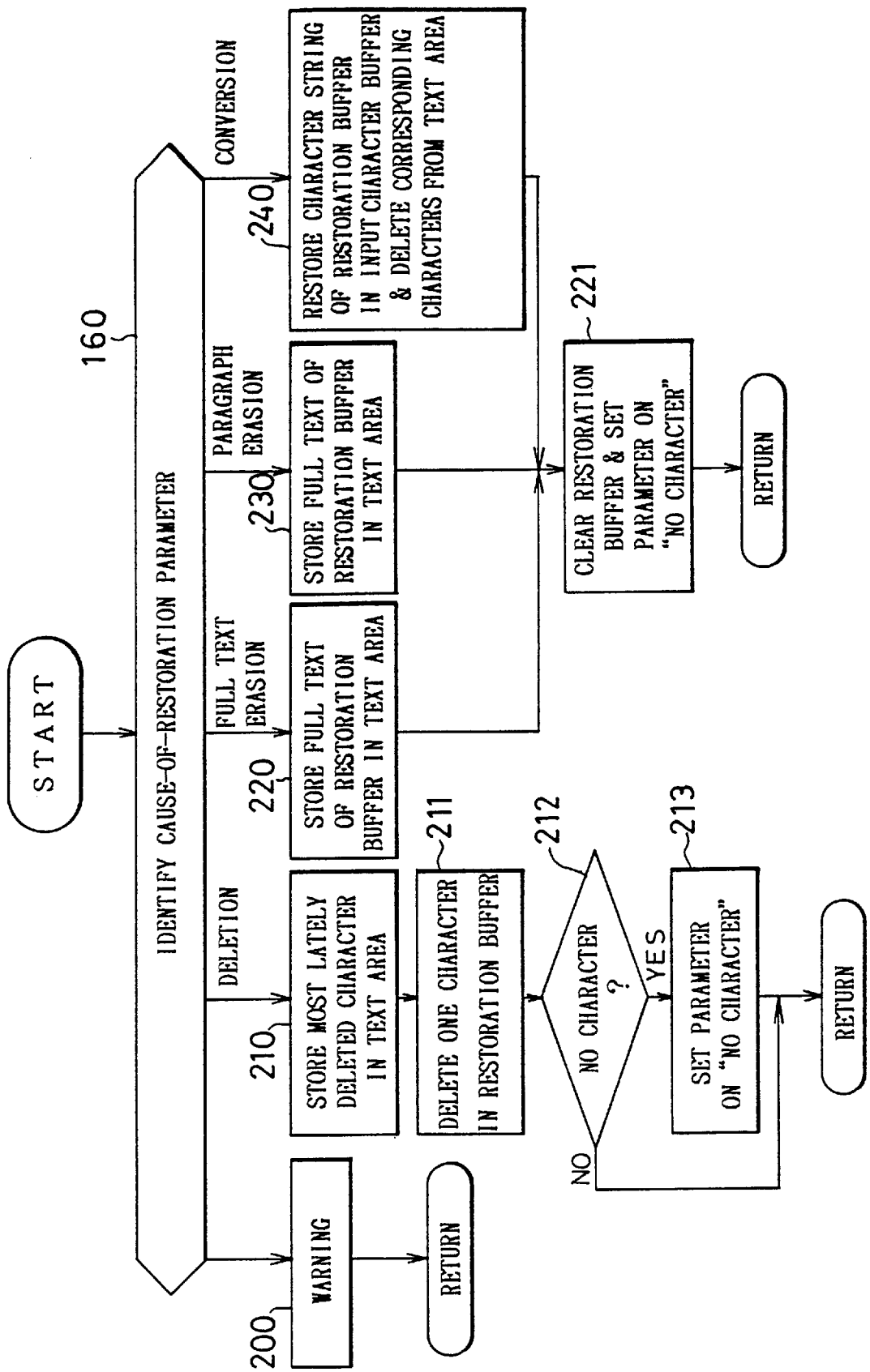

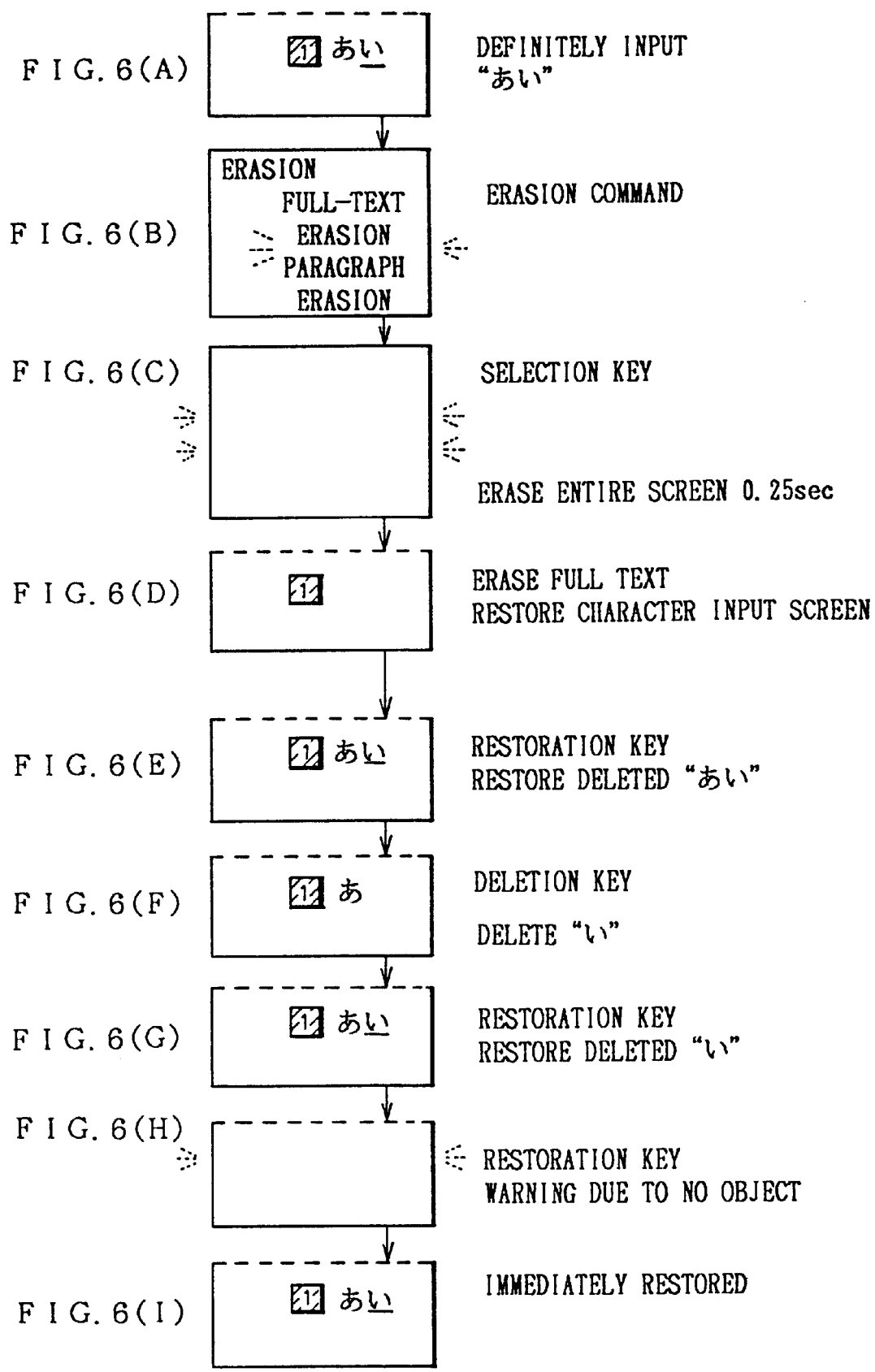

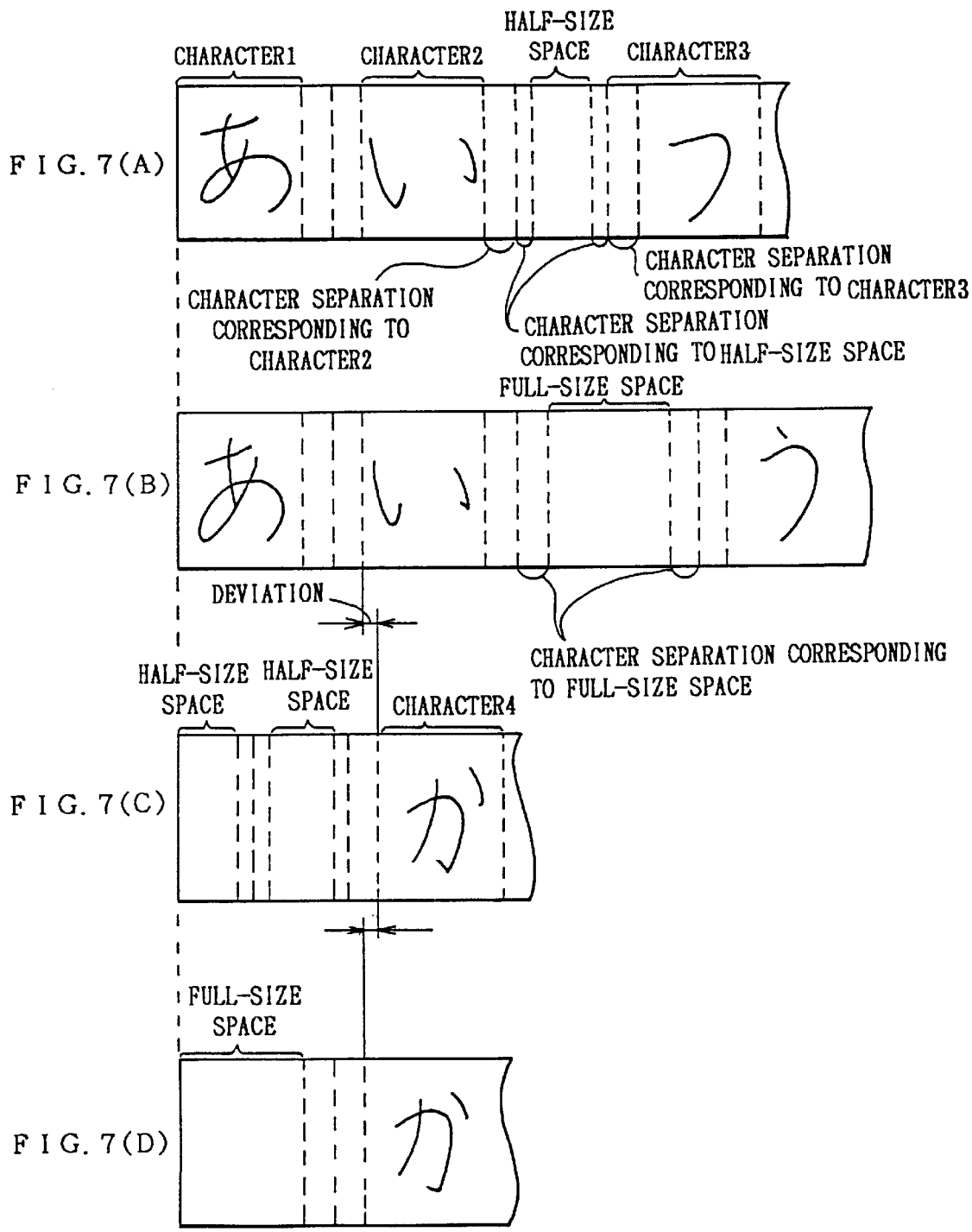

HALF-SIZE SPACE DISPLAY

FULL-SIZE SPACE DISPLAY

PARAGRAPH

PARAGRAPH   PARAGRAPH

PARAGRAPH   PARAGRAPH   PARAGRAPH

INTERLINEAR RULED LINE

INTERLINEAR RULED LINE

FIG. 17(A)
PRIOR ART

| FIRST GROUP | SUZUKI | ×× |
|---|---|---|
| | TAKAHASHI | ○○○ |
| | SATOH | △△ |

FIG. 17(B)
PRIOR ART

| FIRST GROUP | SUZUKI | ×× |
|---|---|---|
| | TAKAHASHI | ○○○ |
| | SATOH | △△ |

FIG. 18(A)

MENU TABLE OF FIRST
HIERARCHICAL LAYER

| KIND | FUNCTION | LOWER-ORDER HIERARCHICAL LAYER: PRESENT (ADDRESS) |
|---|---|---|
| 1 | TEXT ALIGNMENT | |
| 1 | SPACE | |
| 2 | MIRROR IMAGE CHARACTER | |
| 1 | RESTORATION | |

FIG. 18(B)

| KIND | FUNCTION | LOWER-ORDER HIERARCHICAL LAYER: PRESENT (ADDRESS) |
|---|---|---|
| 1 | NORMAL | |
| 1 | LEFT JUSTIFICATION | |
| 2 | CENTER JUSTIFICATION | |
| 2 | RIGHT JUSTIFICATION | |
| 1 | ALIGNMENT | |

FIG. 18(C)

| KIND | FUNCTION | LOWER-ORDER HIERARCHICAL LAYER: PRESENT (ADDRESS) |
|---|---|---|
| 2 | CONTINUOUS | |
| 2 | CLIPPING | |
| 1 | EXTREMELY SMALL | |
| 1 | RELATIVELY SMALL | |
| 1 | NORMAL | |
| 1 | RELATIVELY LARGE | |
| 2 | EXTREMELY LARGE | |
| 2 | AUTOMATIC | |

FIG. 18(E)

LSB

0: NOT CORRESPONDING TO "LEVEL 1"
1: CORRESPONDING TO "LEVEL 1"
0: NOT CORRESPONDING TO "LEVEL 2"
1: CORRESPONDING TO "LEVEL 2"

FIG. 18(D)

| KIND | FUNCTION | LOWER-ORDER HIERARCHICAL LAYER: PRESENT (ADDRESS) |
|---|---|---|
| 2 | NORMAL IMAGE | |
| 2 | MIRROR IMAGE | |

CHARACTER INFORMATION PROCESSOR FOR PRINTING CHARACTERS

This application is a division of application Ser. No. 08/831,217 filed Apr. 2, 1997 which application is now Ser. No. 08/831,217 filed Apr. 2, 1997 is a division of U.S. Ser. No. 08/568,448 filed Dec. 7, 1995, now U.S. Pat. No. 5,680,520, allowed Mar. 28, 1997.

BACKGROUND OF THE INVENTION

1. Field of The Invention

The present invention relates to a character information processor for printing or transferring one or more lines of input characters onto a printing medium. The present invention can be applied to, for example, a device for printing characters on tape (hereunder referred to simply as a tape printing device), which uses tape as a printing medium, and a seal making device in which a transfer medium (or printing medium) is the face of a carved seal.

2. Description of The Related Art

In the case of a conventional tape printing device for printing a title on the spine or back of a binder (namely, a detachable cover with rings or clamps) or on a "title label" to be attached to a cassette for use in a video cassette recorder (VCR) or in a video tape recorder (VTR), input characters entered by using keys such as alphanumeric keys are printed on the other side of the adhesive-backed tape by performing, for example, a thermal transfer printing to thereby produce an objective printed tape.

In this conventional tape printing device, the keys for entering information representing characters are placed on a console panel. Thus a desired sequence of characters can be inputted by operating such keys for entering information representing characters. Moreover, this conventional tape printing device is formed in such a manner that tape can be fed through a tape discharging slot by driving a tape feeding mechanism. Furthermore, a printing mechanism, which is constituted by a thermal print head, and a tape cutting mechanism are placed in series in this passage for tape. When a print instruction key is operated, a control means of the tape printing device controls and causes the tape feeding mechanism to feed the tape at a predetermined speed. The control means further controls and causes a print station to print preliminarily inputted characters on the fed tape. Moreover, upon completion of printing of a sequence of the characters, the control means of the tape printing device continuously controls and causes the tape feeding mechanism to feed the tape until a printed part of the tape goes out of the device. When the printed part of the tape goes out of the device, the control means causes the tape feeding mechanism to make the tape stop running. Further, after the tape stops running, a user operates the tape cutting mechanism to thereby obtain a custom label, on which the sequence of desired characters are printed.

Even in the case of the aforementioned conventional tape printing device, a sequence of desired characters can be inputted and edited by performing an input operation method similar to a method employed in a character information processor such as what is called a word processor. However, in the cases of employing the writing systems of languages, each of which uses many kinds of characters, for example, in the cases of the Japanese and Chinese writing systems, a large number of keys are necessary for directly inputting such characters to the device. Thus, the Japanese characters and the Chinese characters are preliminarily stored in a character-generator memory (hereunder referred to simply as a CG-memory) correspondingly to the combinations of letters of the alphabet of English. Further, the device is endowed with a character conversion function by which a Japanese or Chinese character corresponding to an inputted combination of keyed letters of the alphabet of English is read from the CG-memory. Thereby, the number of necessary keys is reduced. This character conversion function is applied not only to Japanese and Chinese but can be applied to a case where various kinds of symbols, for example, double-wide symbols respectively representing marks such as an arrow, a heart and a spade are stored in the CG-memory (sometimes, such symbols are generically named "full-size character" or "two-byte character"). In the case of converting an input combination of characters of the alphabet of English to a Japanese character, some conventional tape printing devices employ a two-stage conversion method by which the input combination of characters of the alphabet of English is first converted to a set of kana characters of the alphabet of Japanese and subsequently, the set of kana characters are further converted into a kanji character. This method is named "kana-kanji conversion or translation". Kana characters are inputted correspondingly to the pronunciation of a kanji character. In the case where input keys correspond to an English alphabetic code, an input code corresponding to the Roman alphabet is first converted into a kana character code and thereafter, this kana character code is further converted into a kanji character code through the kana-kanji conversion.

The conventional tape printing device, however, is small in size in comparison with ordinary personal computers, electronic typewriters and word processors. Thus, the console panel of the conventional tape printing device has a small area, and a liquid crystal display, on the screen of which only several lines of characters can be displayed, is mounted on a display unit thereof. Further, many people, who have inexperienced in using word processors or the like and are unfamiliar with character inputting operations, use the conventional tape printing device. The conventional tape printing device, therefore, has only a small number of kinds of the functions of editing a sequence of characters, namely, the character editing function of the conventional tape printing device are limited. Thus, the conventional tape printing device does not have, for example, the functions of moving, correcting and reconverting a sequence of characters. Here, the function of moving a sequence of characters (namely, a character string) is defined as that of taking in the character string to be moved after depressing a moving key, and thereafter moving the character string to a designated destination. Further, the function of correcting a sequence of characters is defined as that of automatically deleting a sequence of characters in a designated range to be corrected after depressing a correcting key, and thereafter automatically inserting another sequence of characters inputted until depressing the correcting key, as a substitute for the deleted characters. Moreover, the function of reconverting a sequence of characters is defined as that of bringing back a designated sequence of (definitely) determined characters into an indeterminate state.

The aforementioned insufficiency of functions of editing a sequence of characters has resulted in the need for complex remedial actions against wrong operations such as an erroneous designation of a character input position, a selection of an erroneous character during the kana-kanji conversion and a choice of an erroneous one of two separate forms (namely, hiragana and katakana) of kana. Moreover, in the case of such a remedial action, the frequency of utilizing the deletion function is very high. For example, when moving a character string from its original position, an operator should delete the character string displayed thereat. Further, when correctly changing a sequence of (definitely) determined kanji characters (namely, (definitely) determined Chinese character) into, for instance, another sequence of kanji characters or hiragana characters, the sequence of the kanji characters to be corrected should be deleted. Note that such deleting operations itself should be prevented from being wrongly performed. Furthermore, the screen, on which an input character string is displayed, of the display unit of the conventional tape printing device has a small area, as a result of requiring and pursuing the reduction in physical size and cost of the device. Consequently, most of the conventional tape printing devices do not employ a deleting function of the type, by which the leading character and the ending character of a character string to be deleted, but employs a deleting function by which one character is deleted therefrom each time when a deleting key is depressed. Therefore, the deleting key should be repeatedly operated in order to delete a large number of characters successively. Thus an operator is liable to carelessly operate the deleting key too many times, so that the operator may delete characters which should not be deleted.

Further, a full-text erasing function of erasing all of character strings, which have been an object to be printed on the tape, and a paragraph erasing function of erasing all of a set of lines of characters (hereunder referred to as a paragraph), which is a unit of change in the number of lines or rows, in a combination of character sizes respectively employed corresponding to lines and in the printing style such as vertical writing and horizontal writing, are furnished to the conventional tape printing device as the functions of simultaneously deleting (or erasing) a large number of characters. In the cases of most of the conventional tape printing devices, both of these deleting functions are assigned to operations of simultaneously depressing both of a shift key and a key for deleting a single character and are designated by using a selection menu displayed on the screen of the display unit thereof. Therefore, there has been the fear of performing the full-text erasing function or the paragraph erasing function wrongly.

Meanwhile, in the case of the tape printing device, objects to be printed are labels such as a "title label". Thus, a user of the tape printing device often wishes to print a text containing characters of various sizes, the number of kinds of which is larger than that of kinds of sizes of characters contained in an ordinary printed matter produced by using another kind of character information processor. The tape printing device, therefore, support various sizes of characters and is adapted to easily change the size of characters in a part of a text to be printed. Among such various sizes of characters, in the case of some character size, the number of dots (or pixels) arranged in a vertical direction (namely, in the direction of a column) is equal to that of dots arranged in a horizontal or lateral direction (namely, in the direction of a row). However, in comparison with characters of such a size, a character of another character size is shrunk in the lateral direction. Thus, there are a large number of kinds of the sizes of full-size characters. Further, the character size of a character can be easily changed among the sizes of full-size characters. Thus, half-size characters are not available in the conventional tape printing device. When a user requests the conventional tape printing device to print a character of the size which is of the order of the half size, the tape printing device copes with the user request by using a smaller full-size character size. Here, the "full-size character" is defined as a character represented by using dots arranged in such a manner that the number of dots arranged in a vertical direction is equal to that of dots arranged in a horizontal or lateral direction. Further, the "half-size character" is defined as a character represented by using dots arranged in such a manner that the number of dots arranged in a vertical direction of the "half-size character" is equal to that of dots arranged in the vertical direction of the "full-size character" and that the number of dots arranged in a horizontal or lateral direction of the "half-size character" is half of the number of dots arranged in the horizontal direction of the "full-size character". Incidentally, in the case of kana, which is, so to speak, the alphabet of Japanese, the number of dots required for representing a kana character is as small as that of dots required for representing a letter of the English alphabet. Thus, each kana character can be represented as a full-size or half-size character used for representing a kanji character. In contrast, a large number of dots are necessary for representing each of most of kanji characters, as compared with the number of dots required for representing a letter of the English alphabet. It is thus difficult to represent each of most of kanji characters as a half size character. Consequently, most of kanji characters can be represented only as a full-size character.

Thus, regarding a spacing function, there has been provided only the function of instructing the device to create a space (hereunder referred to as a full-size space), which is as large as a full-size character, when printing.

Labels, which are objects to be printed by the tape printing device, are frequently used as those to be attached to the spine of a file cover, to a cassette (tape) for use in audiovisual (AV) equipment, and to users' belongings for identification of individuals. Character strings inputted to the tape printing device, therefore, often contain no paragraphs, differently from the case of ordinary sentences printed by character information processors such as what is called a word processor. Usually, there is little space in the input character strings. However, spaces are present in an input character string in cases restricted to some extent, for example, in the cases that a personal name should be clearly distinguished from a family name in a character string representing a full name and that the name of a section should be clearly distinguished from that of a department in a character string representing the names of the department and the section of a company.

In the case of the tape printing device, an object to be printed is a label, so that a character pitch (or character spacing) employed in such a label in such a manner as to depend on a designated attribute is made or set to be larger than character pitches employed in documents or the like printed by other character information processors even when an "ordinary" attribute is designated. Therefore, in the case that a space is inserted between the family name and the personal name or between the names of the department and the section as above described, the inserted space becomes fairly large. As a result, labels, which give most of users a sense of incongruity, are formed.

Moreover, the conventional tape printing device further has the function of modifying or embellishing characters and the function of putting a border or frame (namely, a ruled-line frame or enclosure) around a character string. Thereby, the conventional tape printing device can produce various labels.

Meanwhile, the latest tape printing device comes to be able to perform a multi-line printing (namely, to print, for instance, four lines at the maximum simultaneously). Thus, recently, there has been a user request for the printing of a table. Further, there has been already proposed a tape printing device which can fulfill the user request.

For example, when a label, on which a table of FIG. 17(A) is printed, is formed, in the case of the conventional tape printing device, a ruled-line border is designated correspondingly to each of character strings "FIRST GROUP", "SUZUKIxx", "TAKAHASHIOOO" and "SATOHΔΔ".

The conventional tape printing device, however, has drawbacks in that it is necessary for printing a table to designate a ruled-line border correspondingly to each of character strings to be inserted in the ruled-line frame of the table and in that thus the operation of making out the table is complex.

Moreover, the conventional tape printing device further has a drawback in that a same ruled line is printed doubly (or twice) in an overlap among the ruled-line borders respectively put around the character strings and thus each part of the ruled lines, which is doubly printed, becomes thicker than the peripheral ruled-lines of the table.

Furthermore, the conventional tape printing device has additional drawbacks in that if a plurality of character strings belonging to a same column of a table are different in length from one another and moreover, a ruled-line frame is designated correspondingly to and is put around each of the plurality of character strings without taking remedial steps, an incongruent table is formed as illustrated in FIG. 17(B), and in that it is necessary for avoiding making such an incongruent table to designate a ruled-line frame correspondingly to each of the plurality of character strings after suitably inserting spaces into the character strings in such a manner that the plurality of character strings belonging to the same column of the table become of a same length, with the result that the operation of making the table becomes complex.

As described above, the tape printing device is directed mainly to making labels. Thus the tape printing device is adapted to exert many printing effects concerning attributes such as a layout and sizes of characters and a layout of ruled lines, in comparison with other character information processors for printing character strings on predetermined forms of A4-size and B5-size. Consequently, a user can set the tape printing device in such a manner as to exert a given printing effect.

Incidentally, some printing effect (or attribute) is designated (or set) correspondingly to each character. Further, another printing effect is designated correspondingly to each paragraph. Moreover, still another printing effect is designated correspondingly to the whole of the character strings (hereunder sometimes referred to as a sentence) to be printed.

Furthermore, the printing effects to be designated correspondingly to each character are, for example, the modification (or embellishment) of a character, the font thereof, a character pitch, ruled lines and a half-tone dot meshing. Hereinafter, such printing effects will be referred to generically as a mode of a character. Further, the printing effects to be designated correspondingly to each paragraph are, for instance, a combination of character sizes, vertical writing/horizontal writing, a frame and a layout of characters in a paragraph. Hereinafter, these printing effects will be referred to generically as a style of a paragraph. Moreover, the printing effects to be designated correspondingly to each sentence are, for example, effects concerning the position of a character string in the entire label, front and rear margins, and a mirror image character/a normal image character. Hereinafter, these printing effects will be referred to generically as a form of a sentence. As described hereinabove, there are many items to be set (namely, options or choices) for exerting the printing effects. Further, naturally, the tape printing device has a plurality of alternatives for each of the items or options.

Here, if the tape printing device has a large number of alternatives for each of the items or options, the degree of freedom of a label, which a user can make by using the tape printing device, is considerably high, while the operability of the tape printing device becomes low owing to the large number of choices. For example, when a user makes a simple label, there is a fear that the user may feel the troublesomeness or complicatedness of the operation of making a choice. Conversely, if the tape printing device has a limited number of alternatives of each of the items, the operability of the tape printing device is high, while the degree of freedom of a label, which a user can make by using the tape printing device, becomes low. For example, when a user makes an elaborate label, there is a fear that the tape printing device cannot cope with such a user request.

Note that there are additional items to be set (for example, a file editing function), which have a plurality of alternatives, other than the items concerning the printing effects. However, when making a choice with regard to one of the additional items, a problem of a trade-off between the operability and the degree of freedom arises, similarly as in the case of the items concerning the printing effects.

Further, such a problem is caused not only by the tape printing device but also by a character information processor for processing an object to be printed or transferred, which has the considerably high degree of freedom of attributes such as character pitches, character sizes and margins. For example, a similar problem crops up in, for example, a seal making device adapted to use a resin, whose part is hardened upon receiving ultraviolet radiation and left over after the other part is removed by the action of a predetermined fluid, as the face of a seal to be carved by being irradiated with light rays corresponding to input characters (incidentally, this is a transferring operation, and in the specification of the instant application, the term "printing" includes the concept of "transferring").

The present invention is accomplished in view of the aforementioned drawbacks and problems of the conventional device.

Accordingly, an object of the present invention is to provide a character information processor which has many modification functions to be performed according to the level of skill of an operator by using a small number of key entry means.

Further, another object of the present invention is to provide a character information processor that has good operability and can take remedial steps against errors and wrongs, which are caused at the time of inputting and editing characters, by performing simple operations without completing a console panel.

Moreover, a further object of the present invention is to provide a character information processor, by which a printed document or the like giving a user a sense of congruity can be obtained even if a space is inserted into a character string to be printed thereon.

Furthermore, still another object of the present invention is to provide a character information processor, by which an operation of making a table can be easily performed and a table of high printing quality can be obtained.

Additionally, yet another object of the present invention is to provide a character information processor that has good operability and can easily fulfill both of a user request for the operability and a request for the degree of freedom of the contents of a printed document or the like.

SUMMARY OF THE INVENTION

To achieve the foregoing objects, in accordance with the present invention, there is provided an improved character information processor for printing characters on tape or the like, wherein each of various edition functions is established in such a manner as to have levels. When an edition level is selected by an operator by keying, only edition operations, which are available at the selected edition level, are displayed on the screen of a display unit. There are various edition operations, which are available at each edition level. An example of the function of editing a character string is a function for enabling the restoration of a text, on which an edition operation such as an input operation and a deleting operation has been once performed. This function is implemented by providing a restoration buffer in the processor and by storing a character or a character string, on which an operation is performed, and a parameter representing a kind of an operation (namely, a cause-for-restoration parameter) in the processor each time when an operation such as an input and a deletion is performed, and by performing a restoration operation according to the cause-for-restoration parameter. Further, regarding an operation of editing a printing layout, the processor has an operation of performing a text alignment by converting a full-size space, which is inputted by keying similarly as in the case of an ordinary character, into a half-size space to be treated as a space of a size, which is half of the size of a full-size character, when printing. Moreover, regarding an operation of editing ruled lines, the processor has the following edition function to be performed when printing two adjoining (or adjacent) paragraphs in such a way that one side of a ruled-line frame pattern for enclosing one of the two paragraphs overlaps with one side of a ruled-line frame pattern for enclosing the other of the two paragraphs. Namely, this edition function is to generate a connecting ruled-line pattern preliminarily prepared as a frame pattern for an overlap between the two ruled-line enclosure or enclosing patterns in the case that the two ruled-line frame patterns have a same attribute. This facilitates an operation of designating an ruled-line frame (pattern) and prevents ill effects of the double printing of a same ruled line.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a diagram for illustrating the configuration of examples of buffers functioning when editing;

FIGS. 4(A) to 4(H) are schematic flowcharts for illustrating operations relating to a restoration function to be performed when inputting and editing characters;

FIG. 5 is a detailed flowchart for illustrating operations relating to the restoration function to be performed when inputting and editing characters;

FIGS. 6(A) to 6(I) are diagrams for illustrating user's operations and associated changes in indications displayed on the screen of a liquid crystal display (LCD) of the tape printing device embodying the present invention;

FIGS. 7(A) to 7(D) are diagrams for illustrating the contents to be printed on a line;

FIGS. 17(A) and 17(B) are diagrams for illustrating the drawbacks or problems of the conventional method for making a table;

FIGS. 18(A) to 18(E) are diagrams for illustrating a menu hierarchical structure of text formats.

DETAILED DESCRIPTION OF THE PREFERRED EMBODIMENTS

Hereinafter, a preferred embodiment of the present invention (namely, a tape printing device embodying the present invention) will be described in detail by referring to the accompanying drawings. This tape printing device has various character edition functions. First, the entire configuration of the tape printing device for implementing such edition functions will be described hereinbelow by referring to an electrical functional block diagram of FIG. 1 and to FIG. 2 which is a diagram for illustrating a tape cartridge.

Figure 1:
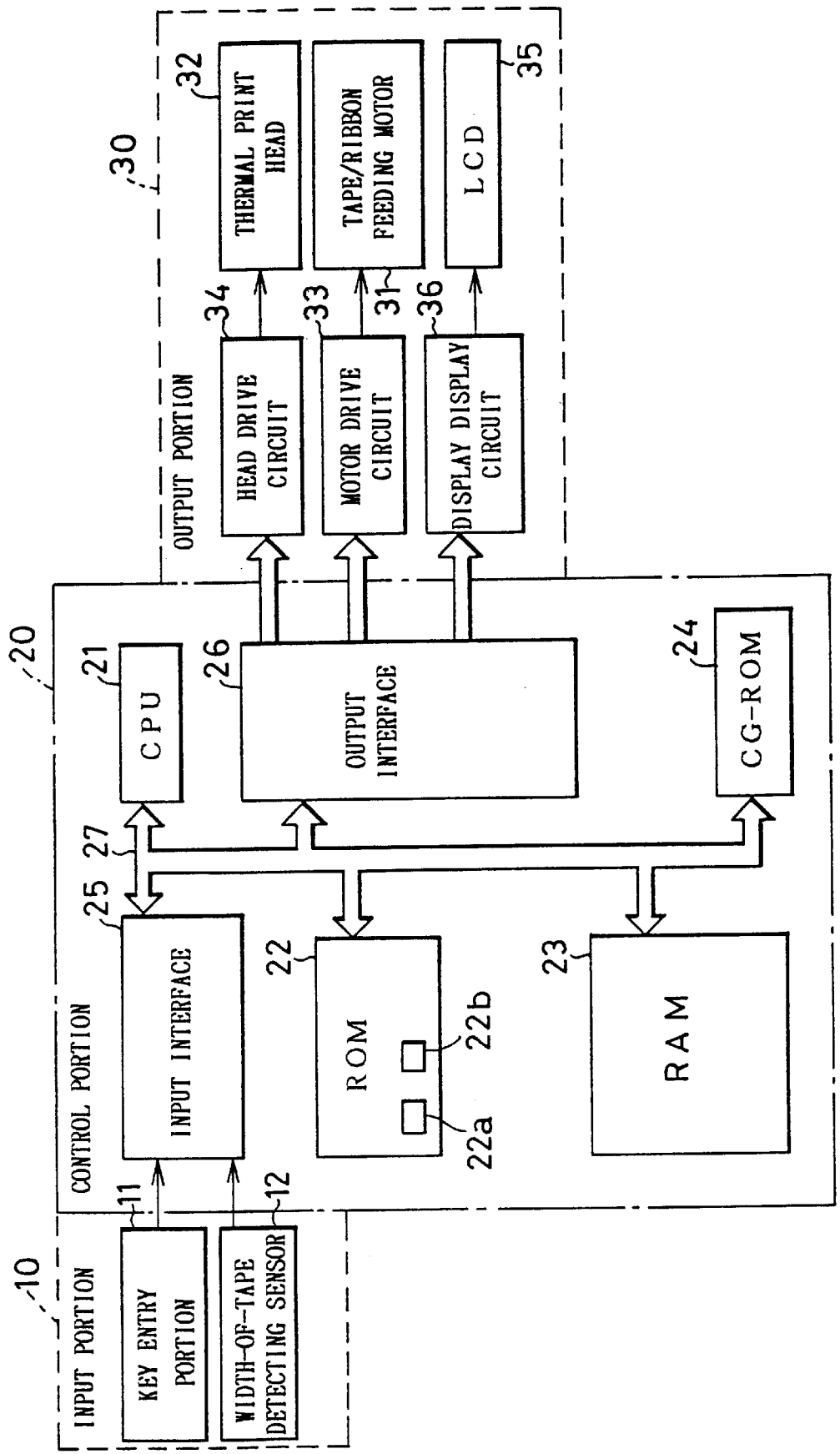
FIG. 1 is an electrical functional block diagram for illustrating a tape printing device embodying the present invention (namely, an embodiment of the present invention)

As illustrated in FIG. 1, this tape printing device mainly consists of an input portion 10, a control portion 20 and an output portion 30, similarly as in the cases of other character information processors. The control portion 20 performs operations according to information sent from the input portion 10 and to the current processing stage. Further, a result of the operation or the like is outputted from the output portion 30 by displaying or printing thereof.

The input portion 10 consists mainly of a key entry portion 11, which has a depression key and what is called a dial key and so forth, and a width-of-tape detecting sensor 12 (incidentally, the detailed description of the structure of the input portion 10 is omitted for simplicity of description). The key entry portion 11 is operative to generate character code data and various kinds of control data, which are given to the control portion 20. The width-of-tape detecting sensor 12 is operative to detect the width of tape loaded in the tape printing device and to give width-of-tape information to the control portion 20. Practically, tape is enclosed in a tape cartridge 2 in which physical identification elements, such as holes, for defining or determining the width of tape are provided. The width-of-tape detecting sensor 12 reads (or detects) the physical identification elements and outputs the width-of-tape information.

Figure 2:
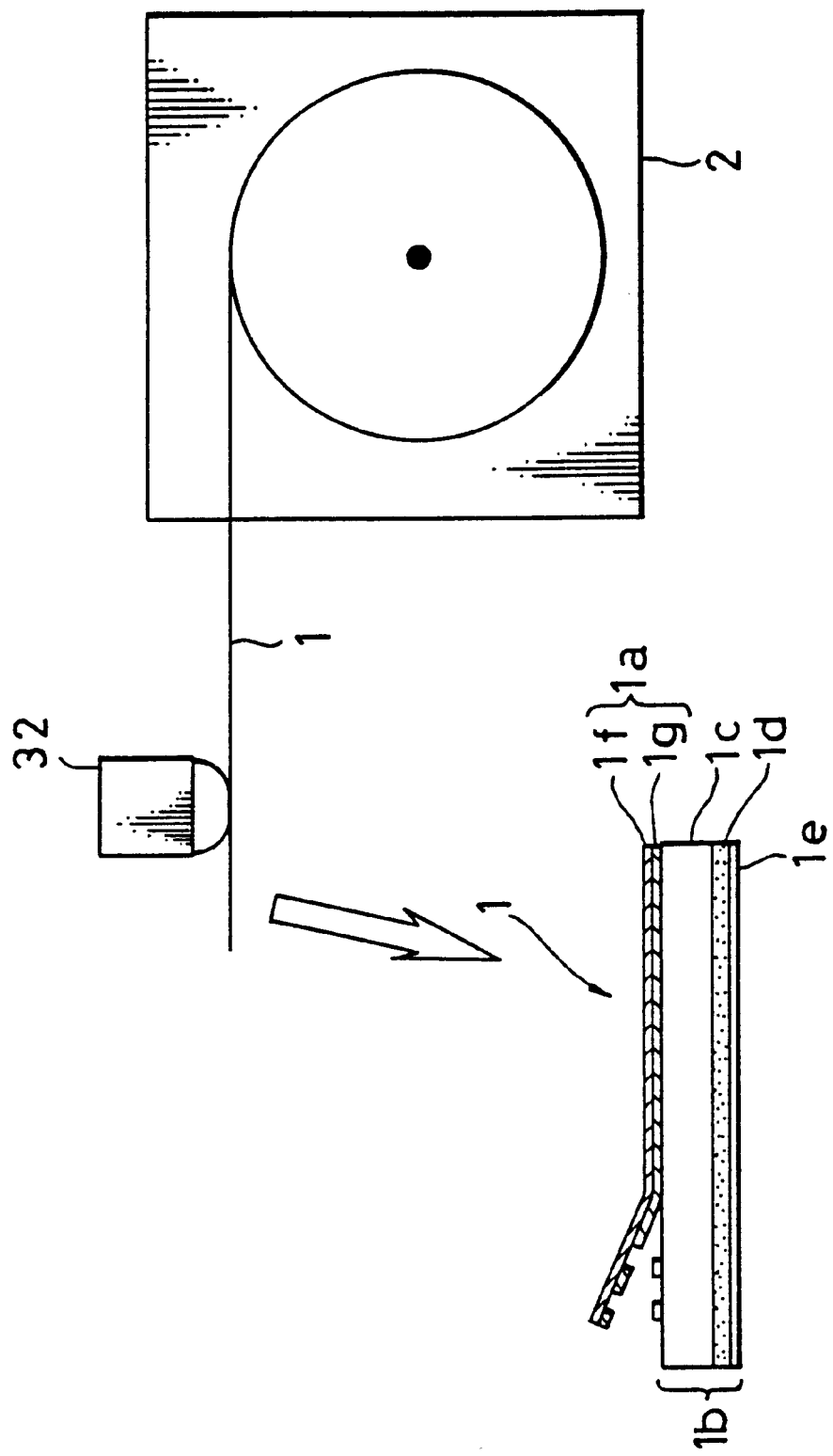
FIG. 2 is a diagram for illustrating the structures of a tape cartridge and tape used in the tape printing device embodying the present invention.

As shown in FIG. 2, both of a sheet of transferring tape 1a and a sheet of transferred tape 1b are wound on a reel in the tape cartridge 2. In the transferred tape 1b, an adhesive layer 1d is formed on a base layer 1c. Further, a cover layer 1e, which is peeled off when the tape 1b is stuck, is loosely glued to this adhesive layer 1d. A surface of the cover layer 1e, which faces the adhesive layer 1d, is covered with a coating so as to facilitate the peeling of the adhesive layer. On the other hand, a surface of the base layer 1f of the transferring tape 1a, which faces the transferred tape 1b, is covered with transferring ink 1g. After selectively heated by a thermal print head 32, the transferring ink 1g of the tape 1 is transferred onto the base layer 1c. Thus, as shown in a lower portion of FIG. 2, characters are formed on a surface of the transferred tape 1b by peeling the transferring tape 1a therefrom.

Colored plastic tape, which is molten by heat, other than the aforementioned two-layer tape may be used as the transferring tape 1a. Further, an example of such plastic tape is tape for use in a printer employed as a printing device of a common or general personal computer system.

In the case of this embodiment, for example, a key dedicated to the issuance of a command to perform a restoration function (to be described later) is provided in the key entry portion 11.

The output portion 30 is composed of print elements and display elements. A tape/ribbon feeding motor 31, which may consist of, for example, a stepping motor, is operative to feed a tape or an ink ribbon (not shown) of FIG. 2 loaded in the tape printing device to a predetermined printing position or to the outside thereof. Thermal print head 32 is operative to print characters on the tape running thereon by performing what is called a thermal transfer printing. For example, the thermal print head 32 can print a maximum of 128 dots simultaneously. The tape/ribbon feeding motor 31 and the thermal print head 32 are driven by the motor drive circuit 33 and the head drive circuit 34, respectively, under the control of the control portion 20. The printed tape is cut by external forces exerted by, for example, a user or a cutter (not shown) driven by a motor (not shown).

In the case of this tape printing device embodying the present invention, a LCD 35 is provided therein as a display portion. This LCD 35 is driven by a display drive circuit 36 under the control of the control portion 20 and is operative to display an input character string, various kinds of attribute information and so forth directly on the screen (not shown) thereof and is also operative to turn on indicators on the screen thereof, which indicators respectively correspond to items of attributes represented by characters printed on the surface of the circumference portion (not shown) of the screen thereof.

The control portion 20 is constituted by, for example, a microcomputer. Further, as shown in this Figure, a central processing unit (CPU) 21, a read-only memory (ROM) 22, a random access memory (RAM) 23, a character-generator ROM (CG-ROM) 24, an input interface portion 25 and an output interface portion 26 are connected with one another through a system bus 27.

Moreover, various processing programs and inalterable data (or constant data) such as kana-kanji translation dictionary data are stored in the ROM 22. On the other hand, the RAM 23 is used as a work memory and is also operative to store inalterable data inputted by a user. Incidentally, when the power is turned off, the contents of the RAM 23 is backed up.

The processing programs and inalterable data stored in the ROM 22, as well as the data stored in the RAM 23, will be described in detail in the aftermentioned description. Incidentally, a processing program 22a for inputting and editing characters is stored in the ROM 22. Further, when executing the processing program 22, a work area to be used for the execution of the processing program is suitably formed or preliminarily established in the RAM 23 and is utilized.

Furthermore, the CG-ROM 24 stores information (hereunder sometimes referred to as font information) on the fonts of letters, digits, or other symbols (hereunder referred to simply as characters), which are supported by the tape printing device embodying the present invention. When code data specifying a character is given (incidentally, the "code data" will be sometimes referred to simply as "character" hereinafter), font information corresponding to the character is outputted from the CG-ROM 24. Here, note that either outline fonts or bitmap fonts may be employed as the fonts which are designated by the font information stored in the CG-ROM 24.

The input interface portion 25 is operative to provide the interface between the input portion 10 and the control portion 20. Further, the output interface portion 26 is operative to provide the interface between the output portion 30 and the control portion 20.

The CPU 21 processes an input signal sent from the input portion 10 and executes a processing program, which is stored in the ROM 22 and corresponds to a current stage of the processing, by utilizing the work area established in the RAM 23 and by suitably using the inalterable data stored in the ROM 22 and in the RAM 23, if necessary. Moreover, the CPU 21 causes the LCD 35 to display information representing the situation or results of the processing on the screen thereof and further causes the thermal print head to print such information on tape (not shown).

Kana-Kanji Conversion

Hereinafter, the kana-kanji conversion will be described in detail.

In the case of this tape printing device embodying the present invention, Japanese characters and Chinese characters can be inputted thereto and edited. Thus, an example of an operation of inputting Japanese characters will be described hereinbelow. Generally, in the case of employing a language, such as Japanese and Chinese, using many kinds of characters, a large number of keys become necessary for inputting such characters directly to the device. Therefore, Japanese and Chinese characters are preliminarily stored in a character generator (CG) memory, correspondingly to combinations of letters of the English alphabet. Further, the device is provided with a character conversion function of reading a Japanese or Chinese character, which corresponds to a combination of letters of the English alphabet inputted by keying, from the CG memory. Thereby, the number of necessary keys can be reduced.

Especially, in the case of inputting Japanese characters, a Roman character code corresponding to the pronunciation of a kanji character is inputted according to the pronunciation system of Roman letters by using input keys corresponding to an English alphabet code. Then, the inputted Roman character code is taken into an input character buffer 23a. Subsequently, this Roman character code is once converted into a code of "kana" which is, so to speak, the Japanese alphabet. At that time, candidates for a kana character corresponding to the inputted Roman character (code) are displayed. When a determination key is depressed, a kana code corresponding to the inputted Roman character code is determined. The (definitely) determined kana code is inputted to a conversion character buffer 23b. This conversion is named an "alphabet-kana conversion (or translation)". Further, there are two separate forms of "kana", namely, "hiragana" and "katakana". It depends on the system configuration which of hiragana and katakana is used in the alphabet-kana conversion. Further, the conversion between hiragana and katakana (incidentally, this conversion is referred to as a hiragana-katakana conversion) can be performed, similarly as in the case of a kana-kanji conversion (to next be described). Furthermore, the kana-kanji conversion is an operation of converting a kana character string, which is obtained by the alphabet-kana conversion, into a corresponding a kanji character.

Namely, the kana-kanji translation dictionary data stored in the ROM 22 is first referred to and subsequently, a kanji character corresponding to the kana character string is read therefrom. Usually, there are a plurality of kanji characters or kanji character strings corresponding to the pronunciation of a Japanese word. The plurality of kanji characters or kanji character strings are taken into the conversion character buffer 23b and are then displayed as candidates for a kanji character (string) to be obtained by the kana-kanji conversion. When an operator selects one of these candidates and further operates the determination key, the selected kanji character (or characters) are determined as a kanji character (or kanji characters) corresponding to the inputted kana character (or the inputted kana characters).

This character conversion function can be used not only in the case of the languages such as Japanese and Chinese but also in the case that the double-wide symbols respectively representing marks such as an arrow, a heart and a spade (sometimes, such symbols are generically named "full-size character" or "two-byte character") are stored in the CG-memory.

Next, the configuration of examples of buffers, which function when inputting and editing characters, will be described in detail by referring to FIG. 3. Incidentally, operations to be performed by utilizing the buffers when inputting and editing characters (especially, operations relating to the restoration function) will be described later.

When inputting and editing character strings, the input character buffer 23a, the conversion character buffer 23b, a restoration buffer 23c, a text area 23d and a display buffer 23e as illustrated in FIG. 3 function. Moreover, a register for input codes, which is provided in the input interface 25 or the CPU 21, also function when inputting and editing character strings. Further, it is first judged whether a code stored in the register is a character code or a control code. If the stored code is a character code, this code is appropriately processed and is then transferred to the input character buffer 23a.

The input character buffer 23a is operative to store a keyword of a character string, which is neither determined (namely, identified) as hiragana, nor as katakana, and nor determined when performing a kana-kanji conversion. For example, letters of the alphabet representing consonant sounds in a Roman-character-input-mode are stored therein. The use of this buffer in the kana-kanji conversion will be described later.

The conversion character buffer 23b is operative to store a character string, on which a "tentative determination" thereof as hiragana or katakana is performed, and current candidates for a kanji character to be obtained by a kana-kanji conversion, among the character strings stored in the input character buffer 23a. Incidentally, in the case of the device of this embodiment, even after a determination operation is performed on hiragana and katakana characters, the bidirectional conversion between the kana and hiragana characters can be performed before an operation of, for example, inputting the next character (string) or moving a cursor (see FIG. 4(E)). An operation of determining a character (string) as hiragana or katakana in such a state is called a "tentative determination" as stated above.

The text area 23d is operative to store all of (definitely) determined input character strings (incidentally, it is supposed that no tentatively determined character strings are stored in the text area 23d). Further, a code representing a line number (or row number) of the character string is stored in the text area 23d.

The display buffer 23e is operative to store a (definitely) determined character string, which is stored in the text area 23d, and a tentatively determined character string, which is stored in the conversion character buffer 23b, around the position of the cursor in such a way that these character strings are displayed as positive images. Moreover, the display buffer 23e is operative to further store an undetermined character string held in the input character buffer 23a, to which no conversion instructions are provided, around the position of the cursor in such a manner that this character string is displayed as a negative image. Additionally, the display buffer 23e is operative to further store a letter of the alphabet representing the pronunciation of a consonant sound, which is stored in the input character buffer 23a, and candidates for a kanji character to be obtained by the conversion, which are stored in the conversion character buffer 23d, around the position of the cursor in such a way that these characters are displayed as blinking images.

This embodiment is provided with the restoration buffer 23c in addition to a group of the buffers provided in the aforementioned conventional device.

This restoration buffer 23d is operative to store a character string deleted from the text area 23d or from the input character buffer 23a by performing a predetermined operation (to be described later). Moreover, the restoration buffer 23d is operative to store a cause-of-restoration parameter 23cP representing a predetermined operation which is a cause for storing a character string in the restoration buffer 23c. When a restoration instructing key newly provided in the key entry portion 11 of this embodiment is operated, a character or character string stored in the restoration buffer 23c is restored in the text area 23d or the input character buffer 23a in a manner represented by the cause-of-restoration parameter 23cP.

Hereinafter, edition functions of the tape printing device of the present invention will be described in detail.

(1) Operations Relating to Restoration Function When Inputting And Editing Characters Next, operations, which relate to the restoration function when inputting and editing characters, will be described by referring to a schematic process flowchart of FIG. 4.

Broadly speaking, there are two kinds of operations relating to the function of restoring a character string, namely, an operation of saving a character string in the restoration buffer 23c (see FIGS. 4(A) to 4(E)) and an operation of extracting (or reading) a character string from the restoration buffer 23c (see FIG. 4G).

During the cursor is placed at the position of the (definitely) determined character, when identifying a command to delete the character, the CPU 2 executes a subroutine of FIG. 4(A). Namely, in step 100, the CPU 21 causes the restoration buffer 23c to store the character at the latest character location and sets the cause-of-restoration parameter 23cP on "deletion". Then, in step 101, the CPU 21 deletes the character from the text area 23d and updates the display buffer 23e in accordance with such deletion of the character. Thus the contents of an indication displayed on the screen of the LCD 35. Subsequently, the CPU 21 is returned to a main routine. The deletion of a character in the case of this embodiment is similar to a procedure named "backspace" to be performed in a word processor or the like.

Incidentally, if receives a command to delete a character when an undetermined (hiragana or katakana) character string is stored in the conversion character buffer 23b and the cursor is placed at the position of the undetermined character string, the CPU 21 adds the undetermined character string, which has been stored in the conversion character buffer 23c, to the text area 23d as a (definitely) determined character string. Then, after clearing the conversion character buffer 23b, the CPU 21 performs the aforementioned operation in step 101. In contrast with this, when deleting undetermined characters, the deleted undetermined characters are not saved to the restoration buffer 23c (incidentally, this is not illustrated in the drawings).

As is apparent from FIG. 4(A), when the deletion of a character is successively performed in this embodiment, these characters are stored in the restoration buffer 23c successively. In this case, the cause-of-restoration parameter 23cP may be given to each of these characters. Alternatively, the cause-of-restoration parameter 23cP may be given to the entirety of these characters.

Further, objects to be saved in the restoration buffer 23c are not limited to characters (including symbols). For example, what is called a beginning-of-line mark representing a line number may be saved therein. In this case, two lines or paragraphs are appropriately connected with each other in step 101. When restoring, an operation of starting a new line and that of starting a new paragraph are performed.

When identifying a command to move the cursor, the CPU 21 starts executing a subroutine of FIG. 4(B). Namely, the CPU 21 operates the display buffer 23e according to the command in step 110. Then, the CPU 21 updates the position of the cursor on the screen of the LCD 35 (and a part of a character string to be displayed) and causes the LCD 35 to display the cursor and the part of the character string. Subsequently, the CPU 21 is returned to the main routine. The cursor moving key is further used to change candidates for various menus. FIG. 4(B) illustrates only the case of using the cursor moving key for issuing a command to move the cursor. If a command to move the cursor is given to the CPU 21 during an undetermined character string (of hiragana or katakana) is stored in the conversion character buffer 23b and the cursor is placed at the position of the undetermined character string, the CPU 21 adds the undetermined character string, which has been stored in the conversion character buffer 23c, to the text area 23d as a (definitely) determined character string. Then, after clearing the conversion character buffer 23b, the CPU 21 performs the aforementioned operation in step 110.

Here, note that as can be understood from the foregoing description of the cursor moving operation of FIG. 4(B), the restoration buffer 23c is not cleared when the cursor is moved immediately after a deletion command, a full-text erasing command or a paragraph erasing command (to be described later) is executed. Namely, even if an operation of moving the cursor is performed just after the execution of a deletion command to save a character string in the restoration buffer 23c, a full-text erasing command or a paragraph erasing command, the restoration buffer 23c is not cleared. Incidentally, in the case that a character string is saved in the restoration buffer 23c in response to a no-conversion command, a katakana conversion command or a kanji determination operation (to be described later), if an operation of moving the cursor is performed just after the saving of the character string, the restoration buffer 23c is cleared (see FIG. 4(H)).

When identifying a command to erase a full text, the CPU 21 starts executing a subroutine of FIG. 4(C). Further, in step 120, all of character strings (which include codes representing lines and paragraphs) stored in the text area 23d are stored in the restoration buffer 23c. Moreover, the cause-of-restoration parameter 23cP is set on "full-text erasion". Next, in step 121, the character strings are deleted from the text area 23d. Moreover, the contents of the display buffer 23e are updated and changed into those for an initial character input screen. Furthermore, the contents of messages displayed on the LCD 35 are altered. Subsequently, the CPU 21 is returned to the main routine.

When identifying a command to erase a paragraph, the CPU 21 starts executing a subroutine of FIG. 4(D). Further, in step 130, all of character strings (which include codes representing lines) stored in the text area 23d are stored in the restoration buffer 23c. Moreover, the cause-of-restoration parameter 23cP is set on "paragraph erasion" (including a paragraph number). Next, in step 131, the character strings are deleted from the text area 23d. Moreover, in response to this, the contents of the display buffer 23e are updated. Furthermore, the contents of messages displayed on the LCD 35 are changed. Subsequently, the CPU 21 is returned to the main routine.

In the case of this embodiment, when the deletion key is operated, a menu containing candidate character strings "full-text erasion" and "paragraph erasion" is displayed. If a selection key is operated when the character string "full-text erasion" is displayed as a candidate, the CPU 21 identifies an input command as a command to erase a full text. If the selection key is operated when the character string "paragraph erasion" is displayed as the candidate, the CPU 21 identifies an input command as a command to erase a paragraph.

Furthermore, when a command to erase a full text or a command to erase a paragraph is inputted, the restoration buffer 23c is cleared by performing an operation of FIG. 4(H) (to be described later).

In the foregoing description, procedures to be performed in the case of saving a character string, which has been stored in the text area 23d, into the restoration buffer 23c have been described. Further, an operation of saving a character string, which has been stored in the input character buffer 23a, into the restoration buffer 23c will be described hereinbelow.

When identifying a valid no-conversion command, the CPU 21 commences executing a subroutine of FIG. 4(E). First, in step 140, the CPU 121 judges from the presence or absence of a character string in the input character buffer 23a whether the character string is tentatively identified (or determined) as hiragana or katakana or is undetermined. If undetermined, in step 141, the CPU 21 causes the restoration buffer 23a to store the character string which has been held in the input character buffer 23a. Moreover, the CPU 21 sets the cause-of-restoration parameter 23cP on "no-conversion". Next, in step 142, the CPU 21 causes the conversion character buffer 23b to store the character string in hiragana notation, which has been held in the input character buffer 23a, as a tentatively determined character string. Moreover, the CPU 21 operates the display buffer 23e and causes the LCD 35 to display the tentatively determined characters. Then, in step 143, the CPU 21 clears the input character buffer 23a and is returned to the main routine. In contrast, after the identification of the no-conversion command, if it is judged that the character string is tentatively determined, the CPU 21 performs a hiragana-katakana conversion on the tentatively determined character string stored in the conversion character buffer 23b in step 144. Namely, if hiragana characters are stored in the conversion character buffer 23b, the stored hiragana characters are converted into katakana characters. Conversely, if katakana characters are stored in the conversion character buffer 23b, the stored katakana characters are converted into hiragana characters. Thus, the CPU 21 operates the display buffer 23e and causes the LCD 35 to performs a hiragana-katakana conversion (or a katakana-hiragana conversion) on the tentatively determined characters displayed on the LCD 35.

When identifying a valid katakana conversion command, the CPU 21 performs a similar operation (not shown). This operation is different from the aforesaid operation, which is performed when inputting the non-conversion command, in that when the undetermined character string is first stored in the conversion character buffer 23b as a tentatively determined character string (in step 142), a katakana character string is stored therein in the case of inputting the katakana conversion command.

Therefore, in the case that no-conversion commands and/or katakana commands are inputted successively, the tentatively determined character varies successively (namely, cyclically) between a katakana character and a hiragana character. Further, if a command other than these commands is issued, the tentatively determined character is stored in the text area 23d as a (definitely) determined character, and moreover, the conversion character buffer 23b is cleared (see step 171 of FIG. 4(H)).

When identifying a kanji conversion determining command, the CPU 21 commences executing a subroutine of FIG. 4(F). Namely, in step 150, a (definitely) determined kanji character string (containing a hiragana character selected by performing a kanji conversion), which has been held in the conversion character buffer 23b, is stored in the restoration buffer 23c. Moreover, the CPU 21 sets the cause-of-restoration parameter 23cP on "kanji conversion".

Next, in step 151, the CPU 21 causes the text area 23d to store the (definitely) determined kanji character string which has been stored in the conversion character buffer 23b. Moreover, the CPU 21 operates the display buffer 23e and causes the LCD 35 to display the (definitely) determined character string. Subsequently, in step 152, the CPU 21 clears the input character buffer 23a and the conversion character buffer 23b. Then, the CPU 21 is returned to the main routine.

Next, an operation to be performed upon receiving a restoration command will be briefly described hereunder. The detail of this operation will be described later by referring to FIG. 5.

When a key for designating the restoration function is operated and a given restoration command is identified, the CPU 21 starts executing a subroutine of FIG. 4(G). First, in step 160, the CPU 21 identifies the contents of the cause-of-restoration parameter 23cP. Then, in step 161, the CPU 21 performs a restoration operation according to the identified cause for the restoration. Upon completion of this operation, the CPU 21 is returned to the main routine.

When identifying a command relating to functions of inputting and editing characters other than the aforementioned functions, if there is a character string held in the restoration buffer 23d, the CPU 21 clears the restoration buffer 23d as illustrated in FIG. 4(H). Then, the CPU 21 executes an operation designated by such a command in step 171. Upon completion of this operation, the CPU 21 is returned to the main routine.

Next, the restoration operation, whose outline is illustrated in FIG. 4(G), will be described hereinbelow by referring to FIG. 5.

When it is concluded from a result of the identification of the contents of the case-of-restoration that no character strings are stored in the restoration buffer 23c, the CPU 21 outputs a warning message, which represents the absence of an object to be restored, in step 200 by operating the display buffer 23e. Thereafter, the CPU 21 restores the character input screen displayed at the time of issuing the restoration command. Then, the CPU 21 is returned to the main routine.

When the cause-of-restoration parameter indicates the "deletion", the CPU 21 adds (namely, copies) a character, which is the latest one of characters stored in the restoration buffer 23c, to a place, which is indicated by the cursor, in a character string stored in the text area 23d in step 210. Correspondingly to this, the CPU 21 operates the display buffer 23e and changes an image displayed on the screen of the LCD 35. Thereafter, in step 211, the CPU 21 deletes a character which is the latest one of the characters stored in the restoration buffer 23c. Then, it is judged whether the restoration buffer 23c comes to store no characters, as a result of such deletion. If there is at least a character still stored in the restoration buffer 23c, the CPU 21 is immediately returned to the main routine. In contrast, if there is no character stored in the restoration buffer 23c, the CPU 21 sets the cause-of-restoration parameter 23cP on "no character string". Thereafter, the CPU 21 is returned to the main routine.

As is apparent from the foregoing description of this operation, a restoration place at which a character (string) is restored may be different from a deletion place from which the character (string) is deleted.

When the cause-of-restoration parameter indicates the "full-text erasion", the CPU 21 adds (namely, copies) all of character stored in the restoration buffer 23c to the text area 23d in step 220, independent of the position of the cursor. Correspondingly to this, the CPU 21 operates the display buffer 23e and changes an image displayed on the screen of the LCD 35. Thereafter, in step 221, the CPU 21 clears the restoration buffer 23c. Then, the CPU 21 changes the contents of the cause-of-restoration parameter 23cP into "no character string". Thereafter, the CPU 21 is returned to the main routine.

When the cause-of-restoration parameter indicates the "paragraph erasion", the CPU 21 adds (namely, copies) all of character stored in the restoration buffer 23c to the locations in the text area 23d, which correspond to the paragraph number contained in the cause-of-restoration parameter, in step 230, independent of the position of the cursor. Correspondingly to this, the CPU 21 operates the display buffer 23e and changes an image displayed on the screen of the LCD 35. Thereafter, in step 221, the CPU 21 clears the restoration buffer 23c. Then, the CPU 21 changes the contents of the cause-of-restoration parameter 23cP into "no character string". Thereafter, the CPU 21 is returned to the main routine.

When the cause-of-restoration parameter indicates "non-conversion" or a conversion such as a "kanji conversion", the CPU 21 adds (namely, copies) all of character stored in the restoration buffer 23c to the input character buffer 23a in step 240. Further, only in the case that the cause-of-restoration parameter indicates a "kanji conversion", a corresponding kanji character is deleted from the text area. Correspondingly to this, the CPU 21 operates the display buffer 23e and changes the current state of the screen of the LCD 35 into an initial displaying state for accepting or selecting the "non-conversion", the "katakana conversion" and the "kanji conversion". Thereafter, in step 221, the CPU 21 clears the restoration buffer 23c. Then, the CPU 21 changes the contents of the cause-of-restoration parameter 23cP into "no character string". Thereafter, the CPU 21 is returned to the main routine.

FIGS. 6(A) to 6(I) are diagrams for illustrating user's operations and associated changes in images on the screen of the LCD 35. Incidentally, in each of these Figures, a square represents the screen of the LCD 35. Further, each square, whose top side is represented by a solid line, represents the entire screen thereof. Moreover, each square, whose top side is represented by a dashed line, represents only a region for inputting and editing characters on the screen thereof.

If a deletion command is given in a situation in which " かい " is definitely inputted (see FIG. 6(A)), one of the "full-text erasion" and the "paragraph erasion" employed as the alternatives is displayed on a menu screen as a current candidate to be selected (see FIG. 6(B)). If the selection key is operated when the "full-text erasion" is displayed as the current candidate to be selected, the entire screen is erased so as to inform a user of the fact that the full-text erasion is achieved. Thereafter, the initial character input screen is restored (see FIGS. 6(C) and 6(D)). Incidentally, at that time, the characters " かい " are stored in the restoration buffer 23c. Moreover, the "full-text erasion" is stored as the cause-of-restoration parameter 23cP. Thereafter, if no operation is performed until a restoration key is operated, the previously deleted character string " かい " is restored in a display (see FIG. 6(E)).

If the deletion key is operated when the cursor is placed at the position of the character " い " the character " い " is erased and only the character " か " remains displayed (see FIG. 6(F)). At that time, the character " い " is stored in the restoration buffer 23c. Moreover, the cause-of-restoration parameter is "deleted". Thereafter, if no operation is performed until a restoration key is operated, the previously deleted character " い " is restored at a position indicated by the cursor in a display (see FIG. 6(G)). At that time, the restoration buffer 23c is cleared.

If the restoration key is operated in such a situation, no object to be stored is present in the restoration buffer 23c. Thus, a warning is issued (by, for example, causing the input screen to blink). Then, the original character input screen is restored (see FIGS. 6(H) and 6(I)).

The aforesaid embodiment is provided with the restoration buffer and the restoration key. In the case of this embodiment, when a character string is deleted or erased from the text area and the character input buffer, the character string is stored in the restoration buffer. After such an operation is performed, basically, if the restoration key is operated immediately, the character string stored in the restoration buffer is restored. Thereby, in the case of this embodiment, simple remedial actions can be easily taken against errors and wrongs occurring on inputting and editing characters without complexing the console panel. Consequently, a character information processor, whose operability is good, can be realized.

Moreover, in the case of the aforementioned embodiment, a restoration position at which a character (string) is restored may be different from a deletion position from which the character (string) is deleted. Thus, the restoration function can be utilized as a function of moving a character (string).

Incidentally, in the case of the kanji conversion, when a command to convert a hiragana character string serving as a keyword into a kanji character string is executed and candidates for the kanji character string are displayed, the hiragana character string acting as the keyword can be restored by operating a cancel key even in the case of the conventional device. However, in the case that the kanji character string is definitely determined, the keyword is deleted from the input character buffer. Thus, in such a case, the hiragana character string cannot be restored by using the cancel key in the conventional device. The restoration function of the present invention is effective in this regard.

Furthermore, there has been developed a word processor having the function of reconverting a (definitely) determined kanji character string into an undetermined hiragana character string. Such a word processor, however, should perform an operation of accessing a kana-kanji translation table backwardly or reversely by using the definitely determined character string as a keyword. Thus, in the case of such a word processor, a processing time is long. Further, a burden is imposed on such a word processor. In these respects, the aforementioned embodiment is useful.

In the foregoing description, modifications of the aforementioned embodiment (hereunder sometimes referred to as a first embodiment) have been described. Moreover, other embodiments, namely, additional modifications of the first embodiment will be described hereinbelow.

In the case of the first embodiment, deleted characters (or character strings) to be restored are designated one by one. However, all of the deleted character strings, which have been stored in the restoration buffer, may be restored by instructing the restoration thereof only one time. Moreover, in this case, even after restored, the restoration buffer need not be cleared. Furthermore, the restoration buffer may be established in such a manner as to be unable to be cleared by operating the cursor moving key. Additionally, a same character string may be restored at different places (namely, the device of the present invention may be provided with a multiple copying function).

Incidentally, the present invention can be applied to a character information processor of the type that a character string to be deleted is deleted by designating the leading and end characters.

Further, in the case of the restoration function of restoring a character (string) deleted or erased, which is employed in the first embodiment, the restoration buffer is cleared when a key other than the deletion key and the cursor moving key is operated. However, the number of kinds of keys, by the operation of which the restoration buffer is not cleared, may be increased.

Needless to say, objects to be restored are not limited to those restored in the aforementioned embodiment. For example, regarding the restoration function of restoring a character (string) deleted or erased, which is employed in the first embodiment, an undetermined character (string) cannot be restored. However, another embodiment of the present invention may be constituted in such a way that an undetermined character (string) can be restored. Furthermore, in a further embodiment of the present invention, a symbol may be restored just after the choice of the symbol is definitely determined.

In the case of the aforementioned (first) embodiment, Japanese character strings are employed as objects to be processed. As a matter of course, character strings of other languages may be employed as objects to be processed. For instance, in the case that character strings of Western languages are employed as objects to be processed, the function of performing a conversion between characters of the different kinds is not necessarily required. The aforementioned embodiment has the functions of deleting and erasing characters and thus can be similarly applied to such a case.

In addition, the number of the restoration keys is not limited to one. Namely, two or more restoration keys may be provided in the device of the present invention.

(2) Function of Editing Space

Next, the function of editing a space for intentionally forming a blank portion when printing will be described hereinafter.

In the case of this (first) embodiment, there are provided two kinds of spaces. Namely, one of the two kinds of spaces is a space, whose blank area is relatively small, called a "half-size space". The other of the two kinds of spaces is a space, whose blank area is relatively large, called a "full-size space".

As is apparent from FIG. 7(A) showing the contents of a printed line, a "half-size space" is used to intentionally form a blank portion of a size which is half of the size of a character. Further, character separations, the size of each of which is half of the size of each of character separations provided on both of the sides of an ordinary character, respectively, are provided on both sides of a half-size space, respectively.

In contrast, as is apparent from FIG. 7(B) showing the contents of a printed line, a "full-size space" is used to intentionally form a blank portion of a size which is equal to the size of a character. Further, character separations, the size of each of which is equal to the size of each of character separations provided on both of the sides of an ordinary character, respectively, are provided on both sides of a full-size space, respectively.

FIGS. 7(A) and 7(B) illustrate the case where the sizes of the character separations provided on both of the sides of each ordinary character are equal to (¼) of the size in the longitudinal direction of each ordinary character. As is seen from FIGS. 7(A) and 7(B), in the case that spaces are contained in a character string, the character string containing full-size spaces extends in a drawn-out way, in comparison with the character string containing half-size spaces.

Thus, this embodiment employs a half-size space as a fundamental space. As stated above, character strings inputted to the tape printing device hardly contain any paragraphs, differently from the case of ordinary sentences printed by character information processors such as what is called a word processor. The number of times of applying spaces is considered to be small. Thus, if a half-size space is employed as a fundamental space, this presents no problem. On the contrary, it is preferable to employ a half-size space is employed as a fundamental space, because a user can be prevented from feeling that a character string intentionally containing such spaces extends in a drawn-out way.

As is apparent from the foregoing description, two half-size spaces can provide a blank portion equivalent to a full-size space. Therefore, in another embodiment of the present invention, only half-size spaces may be used without using a full-size space.

However, in the case of the first embodiment of the present invention, full-size spaces are used in addition to half-size spaces for the following reason.

Namely, there may be cases where the horizontal position of a character of a line or row is adjusted to that of a character of another line. For example, in some case, a space is inserted into a second line of FIG. 7(C) or 7(D) so as to adjust the horizontal position of a leading character "ガ" of the second line of FIG. 7(C) or 7(D) to that of a character " い" of a first line of FIG. 7(A) or 7(B), onto which a character string "がい..." is inputted. FIG. 7(C) illustrates a result of printing the second line by achieving such an adjustment by inserting two half-size spaces thereinto. On the other hand, FIG. 7(D) illustrates a result of printing the second line by achieving such an adjustment by inserting one full-size space thereinto.

Meanwhile, in the case of the tape printing device of the first embodiment, basically, a character separation to be provided on the left side of the leading character of each line is omitted as illustrated in FIGS. 7(A) and 7(B), for the purpose of aligning the beginning or leading characters of lines of different character sizes vertically (namely, in the direction of a column) when a print command employing left justification is issued.

Thus, in the case of FIG. 7(C) in which the aforementioned adjustment is achieved by putting two half-size spaces into the second line, a character separation to be provided on the left side of the leftmost half-size space is omitted. In contrast with this, in the case of FIG. 7(D) in which the aforementioned adjustment is achieved by putting one full-size space into the second line, a character separation to be provided on the left side of the left-most full-size space is omitted. As a result, the character "ガ" of the second line cannot be placed just under the character "い" of the first line in the case that the two half-size spaces are put into the second line. In contrast, the character "ガ" of the second line is placed just under the character character "い" of the first line in the case that the one full-size space is added to the second line.

In the case of the first embodiment, a full-size space is used in addition to a half-size space, namely, the fundamental space, so as to comply with the request for such an adjustment. Incidentally, one or more spaces needed for paragraphing in an ordinary text can be provided by one or more full-size spaces.

Next, an operation of putting one or more half-size spaces into a line and an operation of putting one or more full-size spaces into a line will be described hereunder in this order.

As stated above, this embodiment employs a half-size space as the fundamental space. Therefore, although this embodiment is different from the conventional device in the separation corresponding to the printed space portion, an operation of putting one or more half-size spaces into a line by using the device of this embodiment is the same as that of putting one or more half-size spaces into a line by using the conventional device. Namely, when a space key of the key entry portion 11 is operated, the CPU 21 takes in such a key code and causes the RAM 23 to store the key code. Here, note that a space code employed in the conventional device is used as a half-size space code without being modified.

Figure 8A:
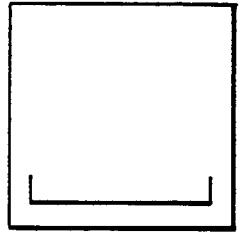
FIGS. 8(A) and 8(B) are diagrams for illustrating modes of displaying a half-size space and a full-size space in the embodiment of the present invention.

Further, when a half-size space is inputted, the half-size space is displayed by using a space of the size which is equal to that of an ordinary character, as illustrated in FIG. 8(A), similarly as in the case of the conventional device. Such a manner of displaying a half-size space is employed in order to let a user known the fact that a half-size space is the fundamental space. Moreover, the reason why a half-size space is displayed on the screen of the LCD 35 by using a space of the size, which is equal to that of an ordinary character, is as follows. First, the displaying of a half-size space by using a space of the size, which is equal to that of a full-size character, can be easily achieved by using a font prepared and stored in the CG-ROM 24. In contrast, if the area of two half-size spaces is displayed by using a space of the size, which is equal to that of a full-size character (as a method employed in another embodiment of the present invention), a computation or operation for performing such a method becomes necessary. Thus, the operation of putting a half-size space becomes complex. Moreover, it is necessary to change the positions, at which characters of a sequence are displayed, as the operation of inputting half-size spaces proceeds. It is, however, inefficient to display two half-size spaces by using a space of the size, which is equal to that of a character, each time when the positions, at which characters of a sequence are displayed, are changed.

Figure 9:
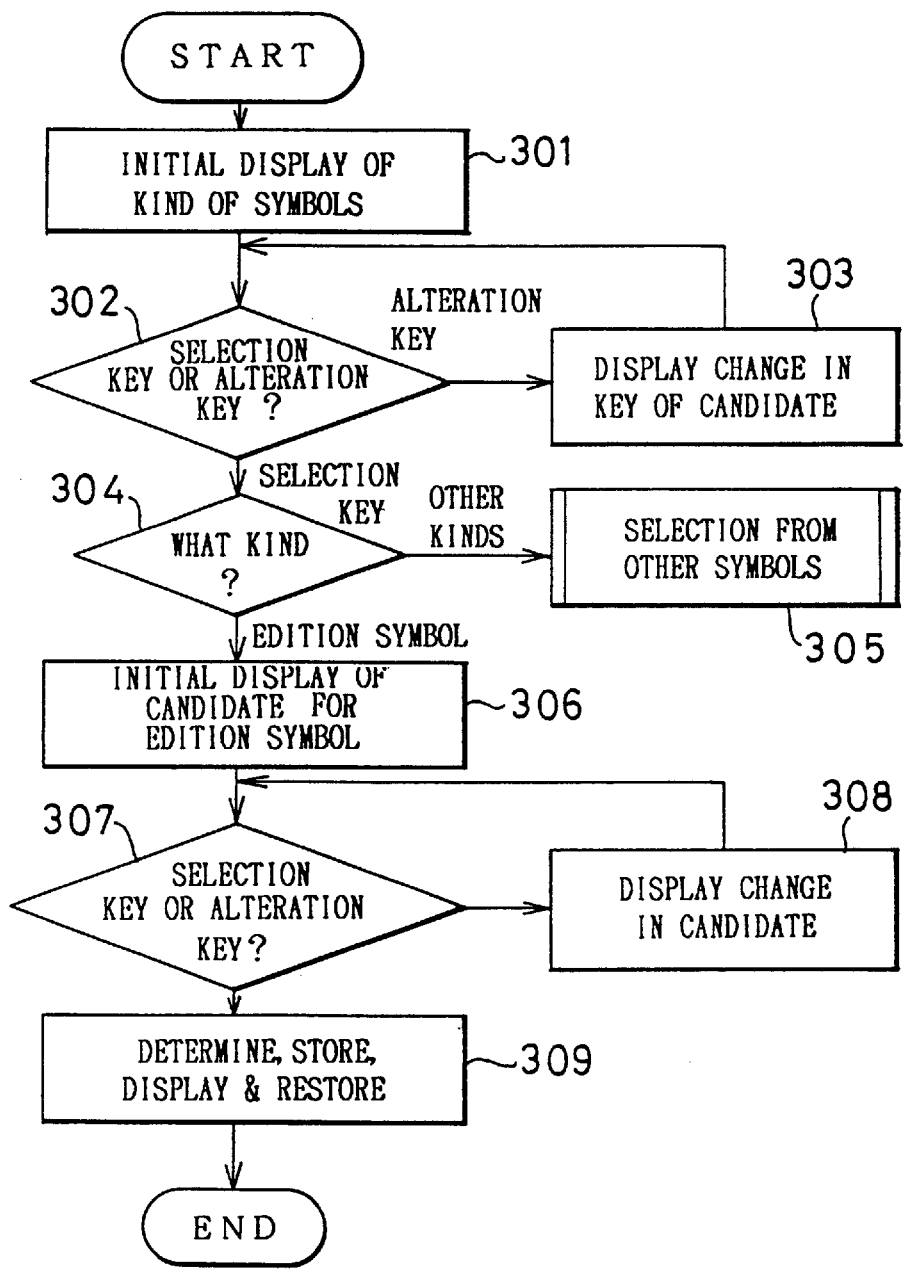
FIG. 9 is a flowchart for illustrating an operation of inputting or taking in a full-size space in the embodiment of the present invention.

Next, an operation of putting one or more full-size spaces into a line will be described hereinbelow by referring to a flowchart of FIG. 9.

In the case of this embodiment, a full-size space is prepared as a symbol. When a symbol key for instructing to input a symbol (for instance, a key dedicated to the inputting of a symbol) is operated, the CPU 21 starts executing a processing program of FIG. 9 stored in the ROM 22.

First, in step 301, the CPU 21 causes the LCD 35 to display an initial candidate for a kind of symbols. Incidentally, in the device of the (first) embodiment, for example, the kind of symbols for use in a VCR (or VTR) cassette, that of unit symbols, that of symbols for description, that of symbols representing various forms of life such as an elephant and a giraffe, that of symbols to be used in mathematical expressions and that of symbols for editing characters are provided as the kinds of symbols. Further, a full-size space is provided in this embodiment as one of the symbols for editing characters. Moreover, the kind of most-frequently-used symbols is displayed as the initial candidate. Alternatively, the kind of symbols, which is selected by a learning function just before the displaying of the candidate, is displayed. Incidentally, in the case of a device in which a plurality of kinds of symbols are displayed at a time, a cursor is placed at a current candidate and subsequently, the current candidate is caused to blink.

Thereafter, in step 302, the CPU 21 judges whether the selection key or an alteration key (to which the cursor moving key corresponds) is operated. If it is judged that the alteration key is operated, the CPU 21 changes the current candidate for the kind of symbols (namely, the kind of symbols displayed by blinking) in step 303. Then, the program returns the CPU 21 to the aforesaid step 302.

If the selection key is operated in a situation in which a kind of symbols is the current candidate, the CPU 21 advances from step 302 to step 304 whereupon the CPU 21 identifies the selected kind of symbols. If a kind of symbols other than the symbols for editing characters is selected, the CPU 21 advances to step 305 whereupon the CPU 21 executes a processing routine so as to choose one of symbols of the selected kind.

Figure 8B:
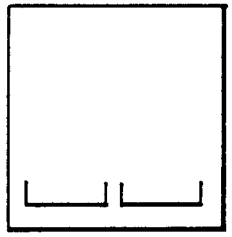

In contrast, if the selected kind of symbols is that of symbols for editing characters, the CPU 21 causes the LCD 35 in step 306 to display one of the symbols for editing characters on the screen thereof as the initial current candidate. In the case of the device of this embodiment, a full-size space is displayed by using an area used for displaying a character, for example, by using a dot pattern indicating that this space corresponds to two of the fundamental space, as illustrated in FIG. 8(B). Naturally, a font of FIG. 8(B) is prepared in the CG-ROM 24.

When the symbol for editing characters, namely, the current candidate is displayed, the CPU 21 judges in step 307 whether the selection key or the alteration key (to which the cursor moving key corresponds) is operated. If it is judged that the alteration key is operated, the CPU 21 changes the current candidate for the kind of symbols (namely, the symbol for editing characters, which is displayed by blinking) in step 308. Then, the program returns the CPU 21 to the aforesaid step 307.

If the selection key is operated in a situation in which a symbol for editing characters is the current candidate, the CPU 21 advances from step 307 to step 309 whereupon the CPU 21 definitely determines that the symbol for editing characters, namely, the current candidate is selected. Then, the CPU 21 causes the RAM 23 to store a code representing this selected symbol for editing characters at a location subsequent to that of the last character code in the text area of the RAM 23. Moreover, the CPU 21 operates the display buffer area and restores the character input screen displayed at the stage where the symbol key is operated. Furthermore, the CPU 21 causes the LCD 35 to display a dot pattern, which represents the selected symbol for editing characters, at a character input position indicated by the cursor when the symbol key is depressed. Then, the operation consisting of the sequence of steps is finished.

Here, if the selection key is operated in a situation in which a full-size space is the current candidate, the CPU 21 advances from step 307 to step 309 whereupon the CPU 21 definitely determines that the full-size space, namely, the current candidate is selected. Then, the CPU 21 causes the RAM 23 to store a code representing this selected full-size space at a location subsequent to that of the last character code in the text area of the RAM 23. Moreover, the CPU 21 operates the display buffer area and restores the character input screen displayed at the stage where the symbol key is operated. Furthermore, the CPU 21 causes the LCD 35 to display a dot pattern of FIG. 8(B), which represents the selected full-size space, at a character input position indicated by the cursor when the symbol key is depressed. Then, the operation consisting of the sequence of steps is finished.

As described above, in the case of the device of this embodiment, a user should select the symbol representing a full-size space from various kinds of symbols each time when inputting a full-size space.

Meanwhile, generally, there is alternative method of taking in a full-size space (to be employed in another embodiment of the present invention) by taking in a space, at which the cursor is placed, as a full-size space when a predetermined key is operated in a situation in which the cursor is placed at a half-size space employed as the fundamental space. However, in the case of the first embodiment, a full-size space is selected by choosing one of the symbols. The reason will be described hereinbelow.

First, only the addition of a symbol to those used in the device is needed for implementing the selection of symbol representing a full-size space. The system configuration (including the CG-ROM 24) is hardly complicated. Second, in the case of employing the aforementioned alternative method, a new input processing routine, which has not been provided in the conventional tape printing device, should be provided in the device of the present invention. It is, however, inefficient from the viewpoint of the effective utilization of the memory capacity of the CG-ROM 22 to create a new input processing routine only for a full-size space. In contrast, in the case of employing the method of selecting a symbol corresponding to a full-size space, it is unnecessary to create a new input processing routine. Moreover, this method can be implemented only by partly modifying the program of selecting one of the symbols.

Printing Operation

Next, an printing operation (especially, a process of forming a space) will be described hereinbelow by referring to FIG. 10. Incidentally, for brevity of description, this Figure illustrates a case of printing a single line of characters. However, note that in the case of printing multiple lines of characters, operations to be respectively performed in steps 401 and 403 to 416 are carried out correspondingly to each of the lines of characters.

Figure 10:
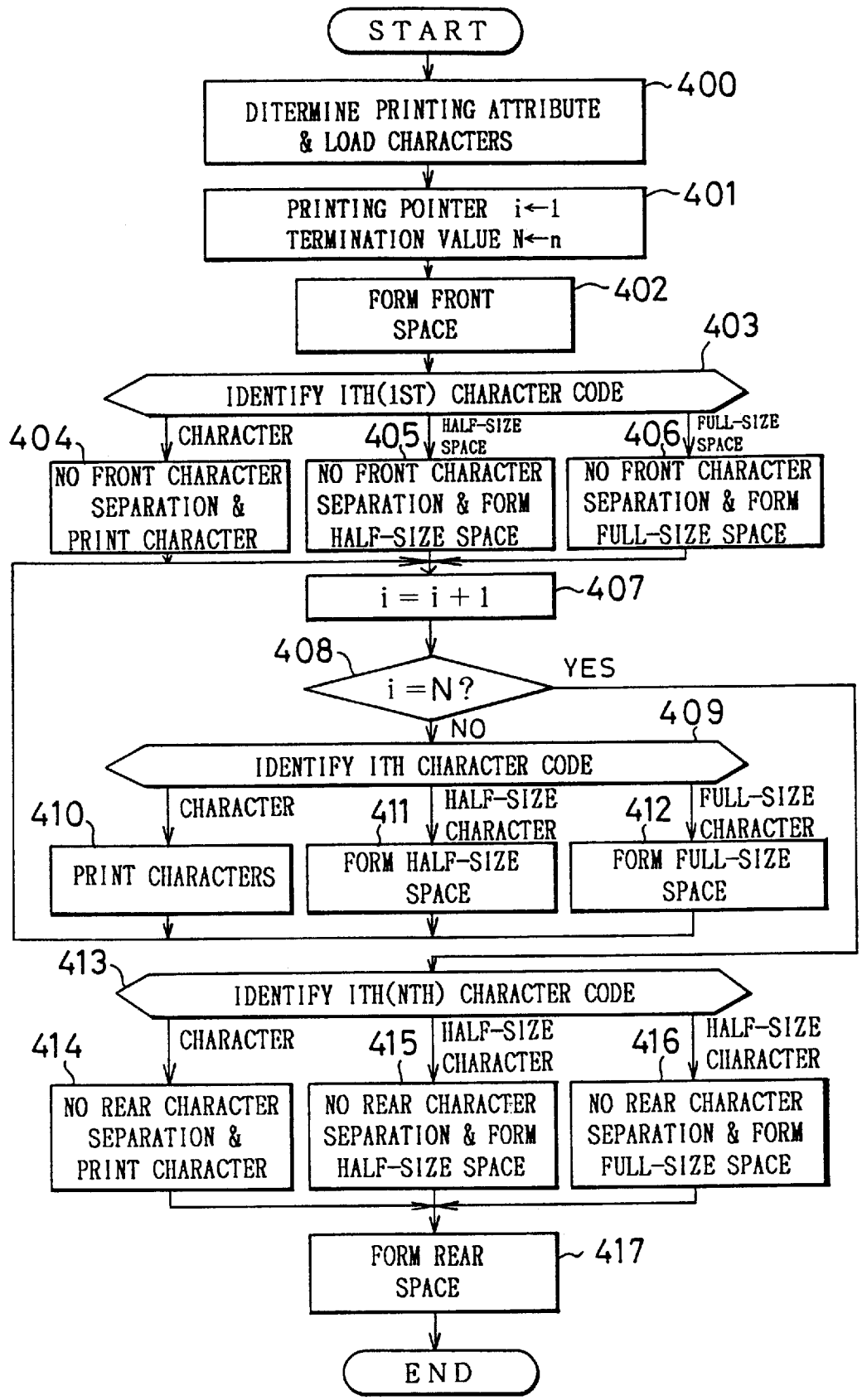
FIG. 10 is a flowchart for illustrating a printing operation of the embodiment of the present invention.

When commencing the process of FIG. 10, the CPU 21 first determines various printing attributes according to the width of tape currently loaded in the device in step 400. Further, the CPU 21 loads a print buffer with (dot patterns of) characters. Incidentally, spaces and character separations are not formed by dot pattern generation, but are formed only by feeding tape. Therefore, the dot pattern generation is performed corresponding only to ordinary characters.

Next, in step 401, the CPU 21 sets a printing pointer i, which represents character code numbers respectively corresponding to characters of the line, at 1, and further sets an operation termination value N at n which represents the number of characters of the line.

Subsequently, in step 402, the CPU 21 controls the tape/ribbon feeding motor 31 so as to form a front (or left) space or margin.

Next, in step 403, the CPU 21 identifies an ith (at that time, first) character code. If the ith character code represents an ordinary character, in step 404, the CPU 21 controls and causes the thermal printing head 32 and the tape/ribbon feeding motor 31 to print the ith character stored in the print buffer, without forming a front (or left-side) character separation (namely, a leader) corresponding to a full-size character. Then, the CPU 21 controls and causes the tape/ribbon feeding motor 31 to form a rear (or right-side) character separation (namely, a trailer) corresponding to a full-size character. If it is judged in step 403 that the ith character code indicates a half-size space, the CPU 21 controls and causes the tape/ribbon feeding motor 31 in step 405 to form a space of the size, which is equal to that of a half-size space, and a rear character separation corresponding to the half-size space (see FIG. 7(C)) without forming a front character separation corresponding to the half-size space. If it is judged in step 406 that the ith character code indicates a full-size space, the CPU 21 controls and causes the tape/ribbon feeding motor 31 in step 406 to form a space of the size, which is equal to that of a full-size space, and a rear character separation corresponding to the full-size space (see FIG. 7(D)) without forming a front character separation corresponding to the full-size space.

Thereafter, the CPU 21 increments the printing pointer i by 1 in step 407. Then, in step 408, the CPU 21 judges whether or not the printing pointer i has reached the termination value N. If not reached, the CPU 21 identifies the ith character code in step 409. If the ith character code represents an ordinary character, in step 410, the CPU 21 controls and causes the tape/ribbon feeding motor 31 to form a front character separation corresponding to a full-size character. Then, the CPU 21 controls the thermal printing head 32 and the tape/ribbon feeding motor 31 to print the ith character stored in the print buffer. Subsequently, the CPU 21 controls and causes the tape/ribbon feeding motor 31 to form a rear character separation corresponding to a full-size character. If it is judged in step 409 that the ith character code represents a half-size space, the CPU 21 controls and causes the tape/ribbon feeding motor 31 in step 411 to form a front character separation corresponding to the half-size space, a space of the size, which is equal to that of a half-size space, and a rear character separation corresponding to the half-size space (see FIG. 7(A)). If it is judged in step 409 that the ith character code indicates a full-size space, the CPU 21 controls and causes the tape/ribbon feeding motor 31 in step 412 to form a front character separation corresponding to the full-size space, a space of the size, which is equal to that of a full-size space, and a rear character separation corresponding to the full-size space (see FIG. 7(B)).

In contrast, if it is judged in step 408 that the printing pointer i has reached the termination value N, the CPU 21 identifies the ith (at that time, Nth) character code in step 413. If the ith character code represents an ordinary character, in step 414, the CPU 21 controls and causes the tape/ribbon feeding motor 31 to form a front character separation corresponding to a full-size character. Subsequently, the CPU 21 controls and causes the thermal print head 32 and the tape/ribbon feeding motor 31 to print the ith character stored in the print buffer. The CPU 21, however, does not cause the tape/ribbon feeding motor 31 to form a rear character separation corresponding to a full-size character. If it is judged in step 413 that the ith character code indicates a half-size space, the CPU 21 controls and causes the tape/ribbon feeding motor 31 in step 415 to form a front character separation corresponding to a half-size space, and a space of the size, which is equal to that of the half-size space. The CPU 21, however, does not cause the motor 31 to form a rear character separation corresponding to the half-size space. If it is judged in step 413 that the ith character code indicates a full-size space, the CPU 21 controls and causes the tape/ribbon feeding motor 31 in step 416 to form a front character separation corresponding to a full-size space, and a space of the size, which is equal to that of the full-size space. The CPU 21, however, does not cause the motor 31 to from a rear character separation corresponding to the full-size space.

Thereafter, the CPU 21 controls and causes the tape/ribbon feeding motor 31 in step 417 to form a rear or right space. Then, the CPU 21 causes the motor 31 to feed tape forward without printing until the terminal end position of a label reaches the position of a cutter.

Advantages of Usage of Half-size and Full-size Spaces

In the case of the aforementioned first embodiment, a space inputted by keying similarly as an ordinary character is taken in, when printing, as a half-size space to be handled similarly as a character whose size is half of that of an ordinary (full-size) character. If half-size space is present in a character string to be printed, the character string is printed by securing a space or blank whose size is half of that of an ordinary (full-size) character. Thus, in a document printed in this way, a space or blank portion, whose size is half of that of an ordinary (full-size) character, is formed correspondingly to the space inputted by a user by keying similarly as an ordinary character. Thereby, an emergence of an excessively wide space, which may give a user a sense of incongruity, in a printed document or the like can be prevented. Consequently, the printing quality can be enhanced.

Moreover, the first embodiment has the aforementioned edition function of utilizing a full-size space in addition to a half-size space. Thereby, among characters of a plurality of lines, the adjustment of the positions in the longitudinal direction of the characters can be accurately achieved.

Furthermore, in the case of the first embodiment, a symbol representing a full-size space is provided therein, and a user selects this symbol when utilizing the full-size space so as to edit character strings. Thus the user can be prevented from performing a wrong operation, for example, inputting a full-size space by mistake for the intended fundamental space (namely, a half-size space).

Additionally, in the case of the first embodiment, each of half-size and full-size spaces is displayed as a space of the size which is equal to that of an ordinary character. Thus, although both of the two kinds of spaces are used in this embodiment, the configuration of the display device can be simplified.

In the foregoing description, the modifications of the first embodiment (namely, the embodiments other than the first embodiment) have been described. Moreover, other embodiments will be cited as follows.

Although the first embodiment employs a half-size space as the fundamental space, a user may select the fundamental space from one of half-size and full-size spaces in another embodiment of the present invention. In the case of this additional embodiment, a user may determine one of half-size and full-size spaces, which is represented by a space code inputted from the key entry portion, as the fundamental space. Further, this additional embodiment may take in the other space by using a symbol.

Incidentally, in the case of the first embodiment, character separations corresponding to a character are formed at both of the front and rear (namely, the left and right sides) of the character but, regarding spaces, character separations corresponding to a predetermined space portion are formed at both of the front and rear (namely, the left and right sides) of the predetermined space portion. In contrast, in the case of a further additional embodiment, regarding characters, a character separation corresponding to a character may be formed only at the front of the character. Moreover, regrading spaces, a character separation corresponding to a predetermined space portion may be formed only at the front of the predetermined space portion.

(3) Frame Forming Edition Functions

The tape printing device of the first embodiment has functions of generating and editing ruled lines for enclosing a character string or a set of character strings (namely, a paragraph) in addition to the aforementioned edition functions to be performed when inputting a character string.

Hereinafter, the concept of a paragraph will be first described. Then, borders, tabular frames and rounded tabular frames (namely, enclosing patterns) will be described by referring to the accompanying drawings.

Figure 11A:
FIGS. 11(A) to 11(C) are diagrams for illustrating the concept of a paragraph.
Figure 11B:
Figure 11C:

A paragraph is defined herein as a set of printed lines or rows, which are arranged in the direction of width of tape (incidentally, a single printed line is included in the concept of a paragraph). Further, a paragraph may be a unit, for which various printing effects (sometimes referred to as paragraph styles), such as the number of lines and the character sizes employed for each line, are designated. A label is formed by arranging one or more paragraphs in sequence in the longitudinal direction of tape and printing the paragraphs. FIGS. 11(A), 11(B) and 11(C) illustrate a label constituted by a single paragraph, a label consisting of two paragraphs and a label composed of three paragraphs, respectively. A border, a tabular frame or a rounded tabular frame can be designated for each of such paragraphs.

Figure 12:
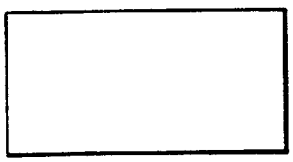
FIGS. 12(A1), 12(A2), 12(A3), 12(A4), 12(B) and 12(C) are diagrams for illustrating examples of frame patterns used in the embodiment of the present invention.
Figure 12:
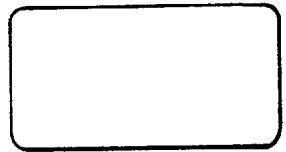
Figure 12:
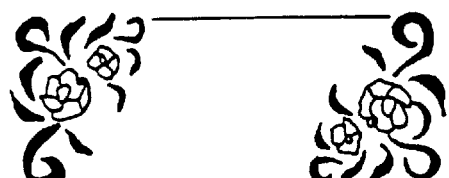
Figure 12:
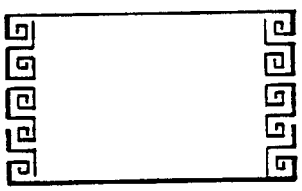

As illustrated in FIGS. 12(A1) and 12(A2), borders are nearly rectangular enclosing patterns, each of which encloses or surrounds all of character strings of a paragraph (incidentally, the frame of FIG. 12(A1) is called "a bold frame", and the frame of FIG. 12(A2) is called "a bold rounded frame"). Hereunder, the left side, the right side, the top side and the bottom side of a border enclosing all of character strings of a paragraph will be referred to as "a front (ruled) line", "a rear (ruled) line", "a top (ruled) line" and "a bottom (ruled) line", respectively. Moreover, ruled lines extending laterally will be referred to as "lateral (ruled) lines". The first embodiment provides borders having front and rear ruled lines to which pictorial symbols are applied, as illustrated in FIGS. 12(A3) and 12(A4). Furthermore, this embodiment provides a full-size border having relatively large pictorial symbols applied to the front and rear ruled lines thereof and a half-size border having relatively small pictorial symbols applied to the front and rear ruled lines thereof. Incidentally, in the cases of borders of FIGS. 12(A1) and 12(A2), front and rear ruled lines are handled similarly as such pictorial symbols.

Figure 12B:
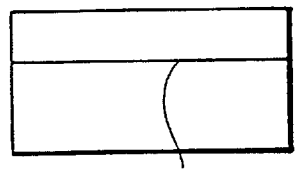

A tabular frame is defined as an enclosing pattern consisting of front, rear, top and bottom ruled lines, which enclose all of character strings of a paragraph, and a lateral ruled line (hereunder referred to as an interlinear ruled line) drawn between adjacent lines of characters, as illustrated in FIG. 12(B). The concept of this tabular frame of this embodiment is introduced for the first time in the art of the character information processor.

Figure 12C:
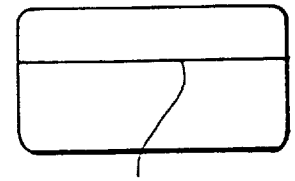

A rounded tabular frame is an enclosing pattern obtained by rounding the corners where pairs of the front, rear, top and bottom ruled lines of a tabular frame as illustrated in FIG. 12(B) join, as illustrated in FIG. 12(C).

In the case of this embodiment, a table can be made by designating a border, a tabular frame or a rounded tabular frame for each paragraph. When making a table, if a paragraph consists of, for example, characters of three lines of different lengths, the distance between the front and rear ruled lines is determined on the basis of the longest line of characters.

Operation of Modifying Paragraph Style

Next, an operation of modifying a paragraph style, especially, an operation of designating a border, a tabular frame or a rounded tabular frame will be described hereinafter by referring to a flowchart of FIG. 13.

Here, attributes concerning a paragraph style are, for instance, whether or not a border, a tabular frame or a rounded tabular frame is added to a paragraph, combinations of character sizes used in each line, vertical writing/horizontal writing, and a layout of characters in a paragraph (for example, center justification, front or left justification, full justification or the like).

Further, a user can modify the style of a paragraph by first positioning the cursor at a paragraph having a style to be modified, and next designating the modification of a paragraph style by use of the key entry portion 11.

Figure 13:
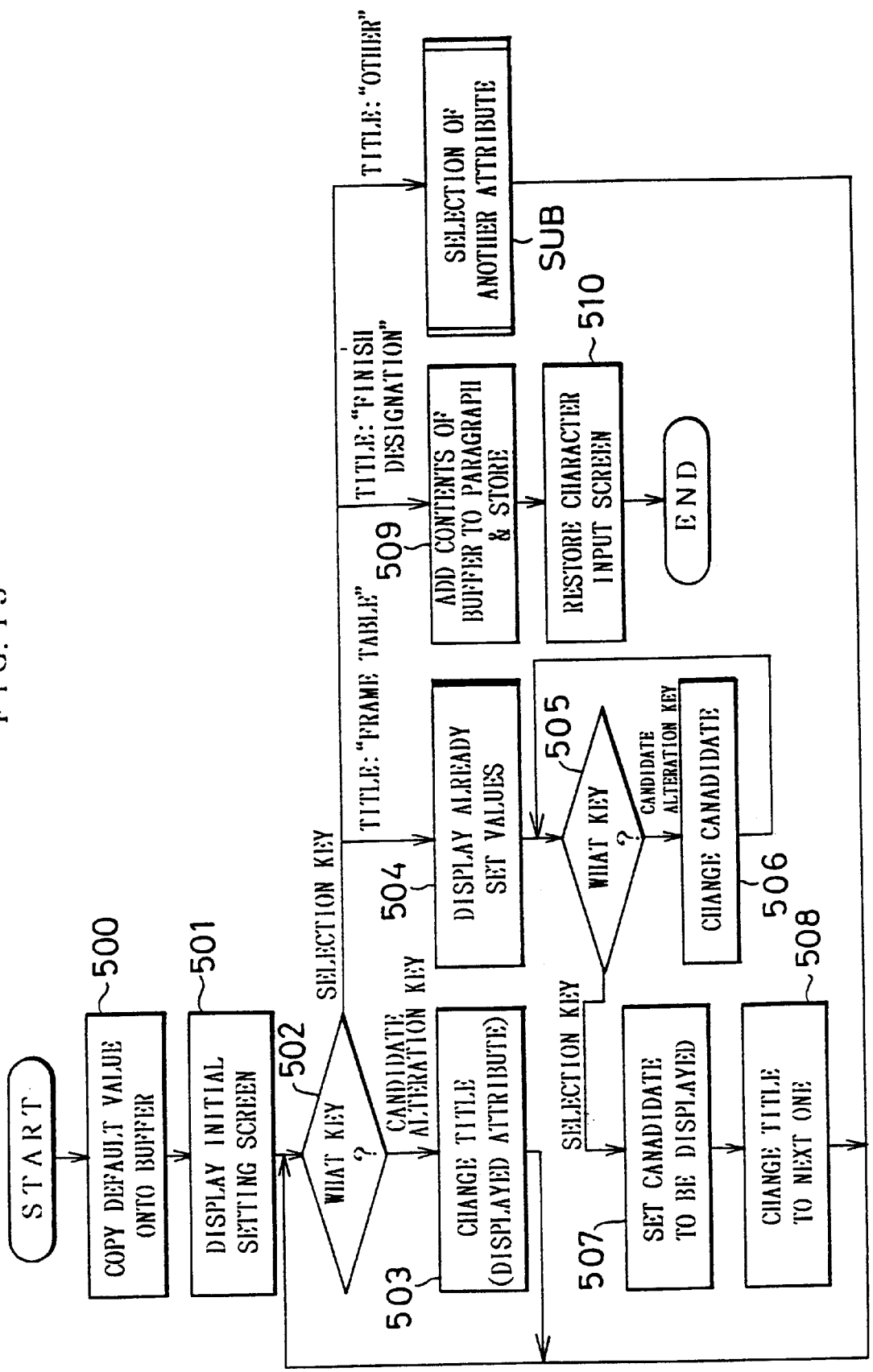
FIG. 13 is a flowchart for illustrating an operation of modifying the style of a paragraph used in the embodiment of the present invention.

At that time, the CPU 21 starts executing a program of FIG. 13 for modifying a paragraph style, which is stored in the ROM 22. Further, in step 500, the CPU 21 first takes in or fetches a-style to be modified, which has been established for a paragraph and stored in the text area. Then, the CPU 21 copies this style onto a style fetching buffer. Subsequently, the CPU 21 causes the LCD in step 501 to display an initial setting screen.

Here, the setting screen is constituted by a title, which represents a kind of an attribute, and a candidate for the title (namely, the kind of an attribute) to be set (incidentally, at the time of initially setting, a default value for the title). If no kind of an attribute (namely, the title) is selected, the item (or option) of the title is displayed as being in a ready state for selection (namely, a selection waiting state). If a title is selected, the item of the title is displayed as being in an already selected state. Incidentally, in an initial setting screen, for example, a combination of character sizes employed by each line is displayed. Moreover, in addition to attributes concerning the style, a title representing the termination of designation (namely, indicating that there is no candidate to be set) is provided in the device.

When the item of the title is displayed as being in a ready state for selection, the CPU 21 identifies an operated key in step 502. When a candidate alteration key (for instance, the cursor key) is operated, the CPU 21 causes the LCD in step 503 to change the title (and alternatives associated therewith) displayed on the screen thereof into another title (and corresponding alternatives). Subsequently, the CPU 21 is returned to step 502 for identification. In contrast, when the selection key is operated, an operation of fetching a value set according to the title displayed at that time or a termination operation is performed.

If the selection key is operated when a title "FRAME-TABLE" corresponding to an attribute to be selected for determining whether or not a border, a tabular frame or a rounded tabular frame is added to a paragraph is displayed, the CPU 21 causes the LCD in step 504 to display values set until that time as being in a ready state for selection. Subsequently, the CPU 21 identifies the operated key in step 505. Incidentally, a default value for the title "FRAME.TABLE" is "NONE" which indicates that a border, a tabular frame and so on are not added to a paragraph. Further, values other than "NONE" are displayed by using a number, which represents a kind such as a border, a tabular frame and a rounded tabular frame, and dot patterns (or characters) representing front and rear ruled lines.

When the candidate alteration key is operated, in step 506, the CPU 21 changes the candidate for the set value into another candidate and further causes the LCD to display the new candidate. Then, the CPU 21 is returned to step 505. When the selection key is operated, the CPU 21 fetches a currently displayed candidate for the set value in step 507. Subsequently, the CPU 21 causes the LCD to display the next title (for example, "FINISH DESIGNATION") according to a predetermined displaying order. Then, the CPU 21 is returned to step 502. Incidentally, if a set value other than "NONE" is displayed as being in a ready state for selection at that time, a display indicator for representing an on- or off-state of such an attribute is blinked. When the selection of a set value other than "NONE" is definitely determined, the display indicator is turned on.

If the selection key is operated when the character string "FINISH DESIGNATION" is displayed, the CPU 21 causes the text area in step 509 to store the paragraph style, which has been held in the style fetching buffer, in a style area thereof accompanying a sentence of the paragraph having the style to be modified. Then, the CPU 21 causes the LCD in step 510 to display the character input screen at the time of instructing the modification of the paragraph style. Thus, the CPU 21 finishes the operation of modifying the paragraph style and is returned to a ready state for inputting character.

When the selection key is operated during a title representing another attribute such as a combination of character sizes used in each line, vertical writing/horizontal writing, and a layout of characters in a paragraph (for example, center justification, front or left justification, full justification or the like), the CPU executes a subroutine SUB corresponding to the selected attribute. An operation to be performed at that time is almost similar to the operation of selecting the set value concerning the attribute to be selected for determining whether or not a border, a tabular frame or a rounded tabular frame is added to a paragraph.

In this way, the CPU 21 can set a value, which represents whether or not a border, a tabular frame or a rounded tabular frame is added to a paragraph, for each paragraph.

Printing Operations

Next, printing operations (especially, a process of adding an enclosing pattern such as a border, a tabular frame and a rounded tabular frame) will be described hereinbelow by referring to a schematic process flowchart of FIG. 14 and a diagram of FIG. 15 for illustrating a printing operation.

Figure 14:
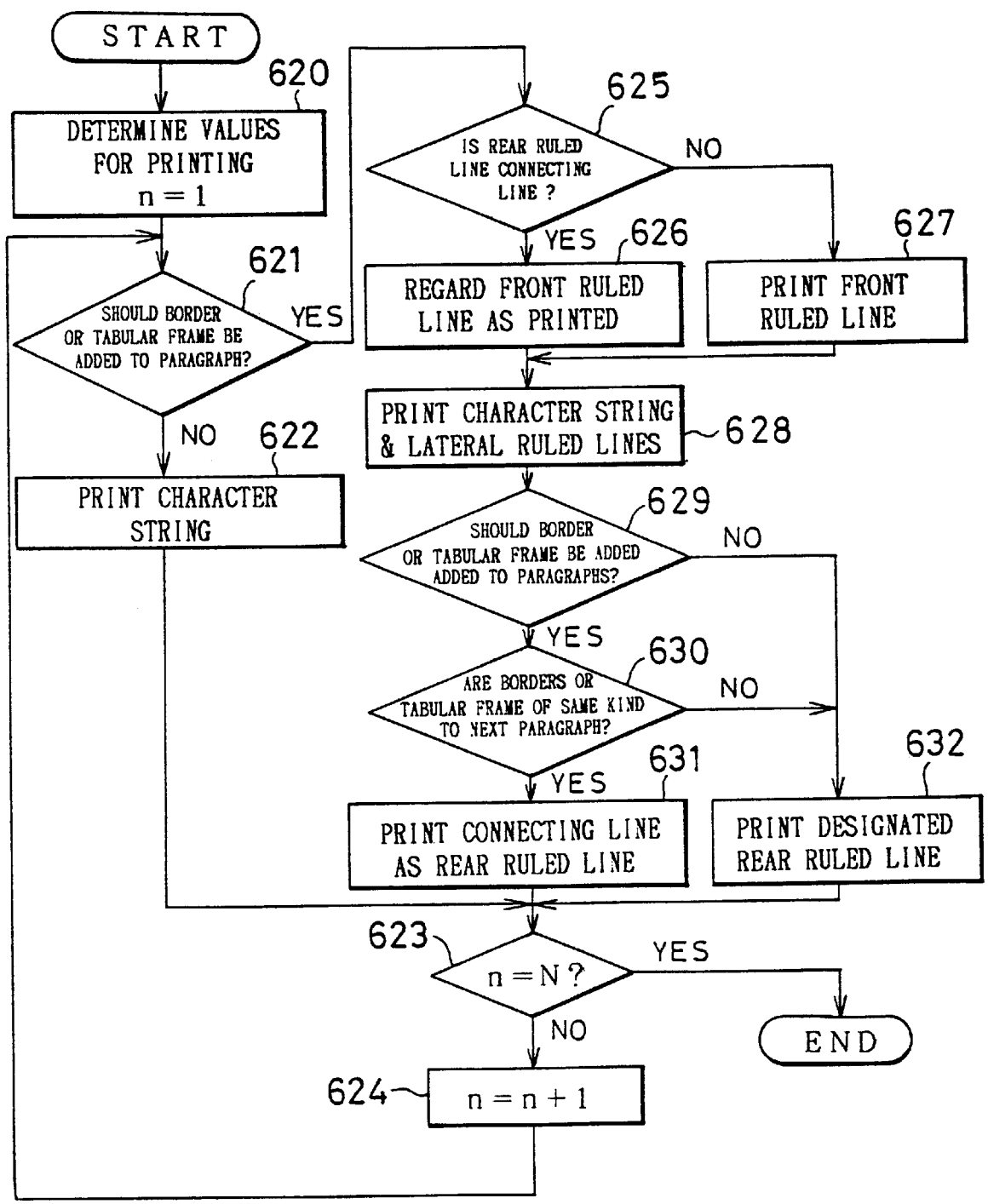
FIG. 14 is a flowchart for illustrating a printing operation of printing ruled lines, which is performed by the embodiment of the present invention.
Figure 15:
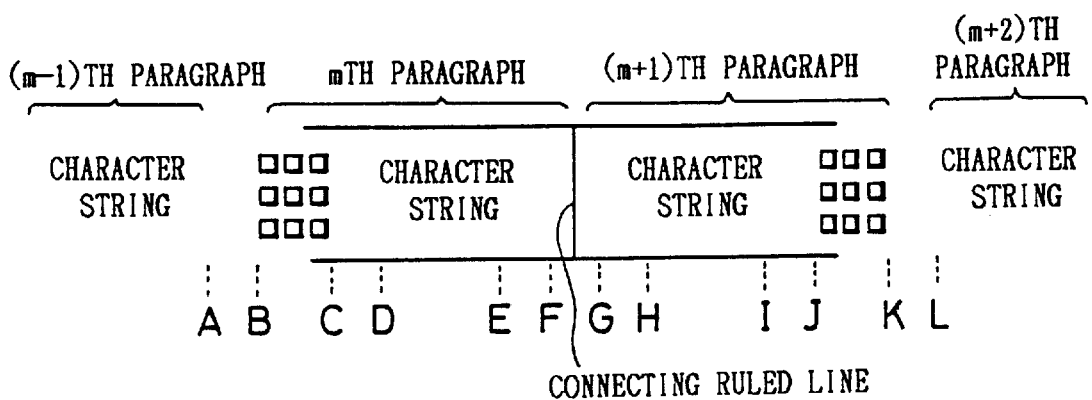
FIG. 15 is a diagram for illustrating the printing operation of the embodiment of the present invention supplementally.

Incidentally, when it is requested to display a printed image, an operation similar to that of FIG. 14 (namely, an operation of loading a dot pattern into the print buffer) is performed.

If a printing key is operated in a state in which a character string is displayed on the screen of the LCD 35, the CPU 21 starts executing a processing program of FIG. 14. First, in step 620, the CPU 21 performs an initial process of preliminarily determining values needed for printing and recognizing the number N of paragraphs. Moreover, the CPU 21 sets a parameter n representing the number of printed paragraphs at 1. Then, the CPU 21 advances to step 621. Incidentally, the initial process, for example, the fundamental length of each of front and rear ruled lines of a border, a tabular frame or a rounded tabular frame to be used, and the size of an inter-paragraph space (namely, the distance between adjacent paragraphs) are determined according to the width of tape detected by the width-of-tape detecting sensor 12.

The CPU 21 judges in step 621 whether a border, a tabular frame or a rounded tabular frame is added to a paragraph corresponding to the value of the parameter n. If not, the CPU 21 instructs to print character strings of the paragraph in accordance with the style thereof (exclusive of a border, a tabular frame and a rounded tabular frame) in step 622. Thereafter, in step 623, the CPU 21 checks whether or not the printing of the last paragraph has been finished. Then, in step 624, the CPU 21 increments the parameter n by 1. Subsequently, the CPU 21 is returned to step 621.

Incidentally, the operation of printing the character string in step 622 includes that of printing a half-size space and forming the front space (in the case where the paragraph concerned is a first paragraph) as illustrated in FIG. 10, and further includes that of securing the distance between adjacent paragraphs. Moreover, when completing the printing of the last paragraph, the operation of forming the rear space (not shown) is performed. Thus, the device finishes a sequence of printing operations.

If a border, a tabular frame or a rounded tabular frame should be added to the paragraph corresponding to the value of the parameter n, the CPU 21 judges in step 625 whether the rear ruled line of the frame enclosing the immediately preceding paragraph is printed and whether a connecting ruled line (as drawn in the portion between the positions F and G of FIG. 15) is printed as this rear ruled line. If a connecting ruled line is printed as such a rear ruled line, the CPU 21 determines in step 626 that the front ruled line of the frame enclosing the paragraph corresponding to the value of the parameter n has been printed. In contrast, if such a rear ruled line is not a printed connecting (ruled) line, the CPU 21 instructs in step 627 to print (the dot pattern representing) the front ruled line (as drawn in the portion between the positions B and C of FIG. 15) of a border, a tabular frame or a rounded tabular frame to be added to the paragraph corresponding to the value of the parameter n.

Thereafter, the CPU 21 instructs in step 628 to print the character strings of the paragraph concerned and the lateral ruled lines (namely, the top and bottom ruled lines and interlinear ruled lines, if any). Incidentally, as illustrated in FIG. 15, a space portion having a width equal to the distance between adjoining paragraphs is secured at the front or rear of the character string. Further, in the case of this embodiment, dot patterns representing the lateral ruled lines are not provided. Namely, the lateral ruled lines are printed by changing values, which are stored at predetermined locations in the print buffer and represents off-dots, into values, each of which represents an on-dot, through software, or by forcibly changing off-dots at predetermined locations in the print buffer into on-dots when the contents thereof are transferred to the thermal printing head 32. The positions of the lateral ruled lines are automatically determined according to the width of tape loaded in the device and the combination of the character sizes employed for each line (incidentally, information representing the positions of the lateral ruled lines is stored in the ROM 22 as table information).

Next, the CPU 21 judges in step 629 whether a border, a tabular frame or a rounded tabular frame should be added to the next paragraph. If should be added thereto, the CPU 21 judges in step 630 whether the kind of a frame to be added to the next paragraph is the same as that of the frame added to the current paragraph. If the frames respectively added to these paragraph are of the same kind, the CPU 21 instructs in step 631 to print a connecting ruled line (whose dot pattern is preliminarily provided in the device) as the rear ruled line of the frame added to the current paragraph. If neither a border, nor a tabular frame, nor a rounded tabular frame is added to the next paragraph or the kind of a frame to be added to the next paragraph is different from that of the frame added to the current paragraph, the CPU 21 instructs in step 632 to print a designated rear ruled line. Thereafter, in step 623, the CPU 21 checks whether or not the printing of the last paragraph has been finished. Subsequently, in step 624, the CPU 21 increments the parameter n by 1. Then, the CPU 21 is returned to step 621. Incidentally, as illustrated in FIG. 15, a space portion having a width equal to the distance between adjoining paragraphs is secured at the rear of the printed rear ruled line.

In the case of this embodiment, the bold frame of FIG. 12(A1) and the tabular frame of FIG. 12(B) are regarded as of the same kind. Similarly, the bold rounded frame of FIG. 12(A2) and the rounded tabular frame of FIG. 12(C) are regarded as of the same kind.

Incidentally, FIG. 14 illustrates the printing operation of printing ruled lines for the purpose of making characteristic features of this embodiment clearly understandable. Thus, in this Figure, the relation between the loading of dot patterns into the print buffer and the transferring of the contents of the print buffer to the thermal print head 32 is explicitly illustrated. Thus, after all of necessary dot patterns are loaded into the print buffer, the dot patterns may be transferred to the thermal print head 32. The loading of the dot patterns into the print buffer and the transferring of the dot patterns to the thermal print head 32 may be performed concurrently with each other.

Figures 16A, 16B:
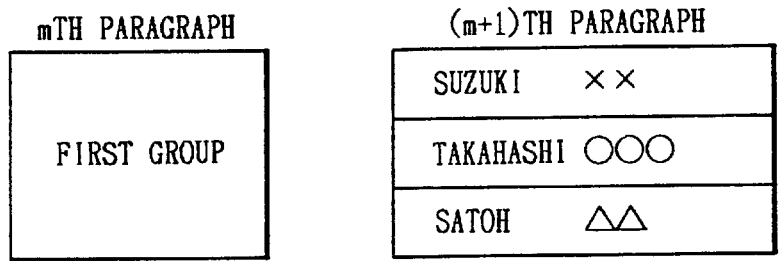
FIGS. 16(A) to 16(C) are diagrams for illustrating a pattern for making a table, which is used by the embodiment of the present invention.
Figure 16C:
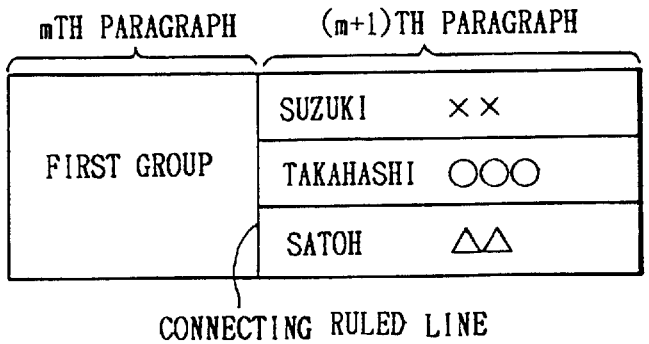

Here, it is assumed that an (m−1)th paragraph is accompanied with neither a border, nor a tabular frame nor a rounded tabular frame, that an mth paragraph is accompanied with a bold frame and contains a character string "FIRST GROUP" as illustrated in FIG. 16(A), and that an (m+1)th paragraph is accompanied with a tabular frame and contains three lines of character strings "SUZUKIxx", "TAKAHASHIOOO" and "SATOHΔΔ" as illustrated in FIG. 17(B). In such a case, a table of FIG. 16(C) can be obtained by executing the processing program of FIG. 14.

As described above, the character information processor of the aforementioned (first) embodiment has a tabular frame and a rounded tabular frame in addition to a border as enclosing patterns for enclosing a character string of a paragraph. In the case that a tabular frame or a rounded tabular frame is designated, if the paragraph consists of characters of lines of different lengths, the distance between the front and rear ruled lines is determined on the basis of the longest line of characters. It is, therefore, unnecessary to equalize the lengths of the lines of characters contained in the paragraph. Moreover, enclosing patterns for a tabular frame and a rounded tabular frame are provided in the processor of this embodiment. Furthermore, the characters of each line are printed according to the designated one of the enclosing patterns. The character information processor of this embodiment, however, does not need to perform an operation of enclosing a character string on each line in a paragraph, differently from the conventional character information processor.

Further, when the frames (namely, the enclosing patterns) respectively added to paragraphs adjoining in the longitudinal direction of tape are of the same kind, the character information processor of the aforementioned (first) embodiment operates in such a manner as to connect these enclosing patterns with each other. Thereby, an operation of making a table can be simplified. Moreover, the operability of the processor can be enhanced.

Although the front and rear ruled lines of the enclosing pattern used to make a table are printed lines in the case of the first embodiment, each of the front and rear ruled lines may be replaced with pictorial symbols aligned in a column (or row). Moreover, the connecting ruled line is not limited to the line as illustrated in FIG. 15 but may be replaced with pictorial symbols aligned in a column (or row), similarly. In the case that the front ruled line, the rear ruled line or the connecting line is linear, such a line may be formed by changing predetermined dots contained in the print buffer into on-dots by means of software, instead of using a dot pattern read from the CG-ROM 24.

As above described, the tape printing device of this embodiment has the function of restoring a character string on inputting and editing characters, as a character editing function. Moreover, the tape printing device of this embodiment further has the function of editing spaces for intentionally blank portions when printing, and the function of generating ruled lines. The addition of these functions to the device, however, causes the inconvenience of setting the device to a user who is unskilled in operating the device, or to a user who wishes to make the device perform only a simple printing operation. Thus, the tape printing device of this embodiment is adapted to show a user a group of predetermined options or choices and to cause a phased-change in the number of alternatives to be selected, according to a command inputted by the user.

Here, the term "an alternative level" is defined as a stage of the number of alternatives to be shown to a user. In the case of this embodiment, there are two "alternative levels", namely, "Level 1" and "Level 2". In the case of "Level 1", the number of alternatives is small. In contrast, in the case of "Level 2", the number of alternatives is large. Thus, kind-of-option information representing an alternative level designated correspondingly to each alternative, at which level a corresponding alternative is shown to a user as a candidate for the selection, is added to information representing the corresponding alternative, which is provided in the ROM 22. Incidentally, information representing an alternative level designated by a user is stored in the RAM 23.

In the case of the tape printing device of this embodiment, the concept of the alternative level is introduced into items to be set (or options) respectively corresponding to the printing effects such as character modes, paragraph styles and text formats. Moreover, the concept of the alternative level is introduced into items to be set respectively corresponding to functions such as a file edition function, a bar-code-standard designating function and a consecutive number adding function.

Next, alternative levels corresponding to an item or option (in this case, a set of all of text formats is employed as an example of the item) will be more practically described hereinbelow. FIGS. 18(A) to 18(E) illustrate a menu hierarchical structure of text formats, which is stored in the ROM 22 as a table. Incidentally, although the menu of text formats has a three-layer structure, FIGS. 18(A) to 18(E) illustrate only first and second layers thereof. Further, a third hierarchical layer is used to fetch data concerning the length of tape and is unrelated to alternative levels (incidentally, the third hierarchical layer corresponds to "Level 2", from a different point of view).

In the case that a set of all text formats is employed as an item to be set, menu items of a first hierarchical layer of FIG. 18(A), such as the "TEXT ALIGNMENT", "SPACE", "MIRROR IMAGE CHARACTER" and "RESTORATION" are alternatives, to which symbols representing kinds of alternatives "1", "1", "2" and "1" are respectively added. Further, the alternatives, to which the kind "1" is added, are those which can be shown to a user as a candidate for the selection when the alternative level designated by the user are "Level 1" or "Level 2". Moreover, the alternative, to which the kind "2" is added, is an alternative which can be shown to a user as a candidate for the selection only when the alternative level designated by the user is "Level 2".

The alternative "ALIGNMENT" relates to the length of a label and the position of a text in the label. Further, the alternative "SPACE" relates to the length of each of front and rear spaces provided at the front and rear of a label, respectively. Moreover, the alternative "RESTORE" is to reset all of the values of formats to default values thereof. Namely, the kind "1" is added to the alternatives, the necessity of which is relatively high. On the other hand, the alternative "MIRROR IMAGE CHARACTER" is to instruct the device to print a character by using a mirror image character or a normal image character. It is considered rare to instruct the device to print the character by using a mirror image character. Namely, the kind "2" is added to such an alternative, the necessity of which is relatively low.

Incidentally, this embodiment employs the CPU 21 which processes data in units of 8 or 16 bits. Thus, each of the kinds of alternatives is represented by using 8 bits as illustrated in FIG. 18(E). Further, the least significant bit (LSB) represents whether an alternative corresponds to "Level 1" (namely, the LSB has a logical value "1") or the alternative does not correspond to "Level 1" (namely, the LSB has a logical value "0"). Moreover, the second least significant bit represents whether an alternative corresponds to "Level 2" (namely, the second least significant bit has a logical value "1") or the alternative does not correspond to "Level 2" (namely, the second least significant bit has a logical value "0"). The other six high-order bits are unrelated to the alternative levels. Therefore, data, whose two low-order bits are "11", is given to the alternative of the kind "1" as the kind-of-alternative information. Similarly, data, whose two low-order bits are "10", is given to the alternative of the kind "2" as the kind-of-alternative information.

When making a choice, if the alternative level designated by a user is "Level 1", an alternative to which the kind-of-alternative information, whose LSB is "1", is given, is retrieved. Further, if the alternative level designated by a user is "Level 2", an alternative to which the kind-of-alternative information, whose second least significant bit is "1", is given, is retrieved.

In the cases of the alternatives "TEXT ALIGNMENT" and "SPACE", which are of the kind "1" and correspond to alternatives of the second hierarchical layer (and are the items to be set), symbols representing the kinds of alternatives of the second hierarchical layer are established correspondingly to the necessity thereof, as illustrated in FIGS. 18(B) and 18(C). In contrast, in the case of the alternative "MIRROR IMAGE CHARACTER", which is of the kind "2" and corresponds to alternatives of the second hierarchical layer, the kind "2" is similarly set as the kind of the corresponding alternatives of the second hierarchical layer, as illustrated in FIG. 18(D). This is natural because the alternative "MIRROR IMAGE CHARACTER" of the kind "2" is not selected from the alternatives of the first hierarchical layer.

In the foregoing description, an example of setting the symbols representing the kinds, which correspond to the alternative levels, in the case that the item to be set (namely, the option) is a set of all of text formats (namely, the styles of text formats) has been described. However, as to the other items of the first and second hierarchical layers, symbols representing the kinds, which correspond to alternative levels, are preliminarily set in a similar manner.

Operation at Power-on

Figure 19A:
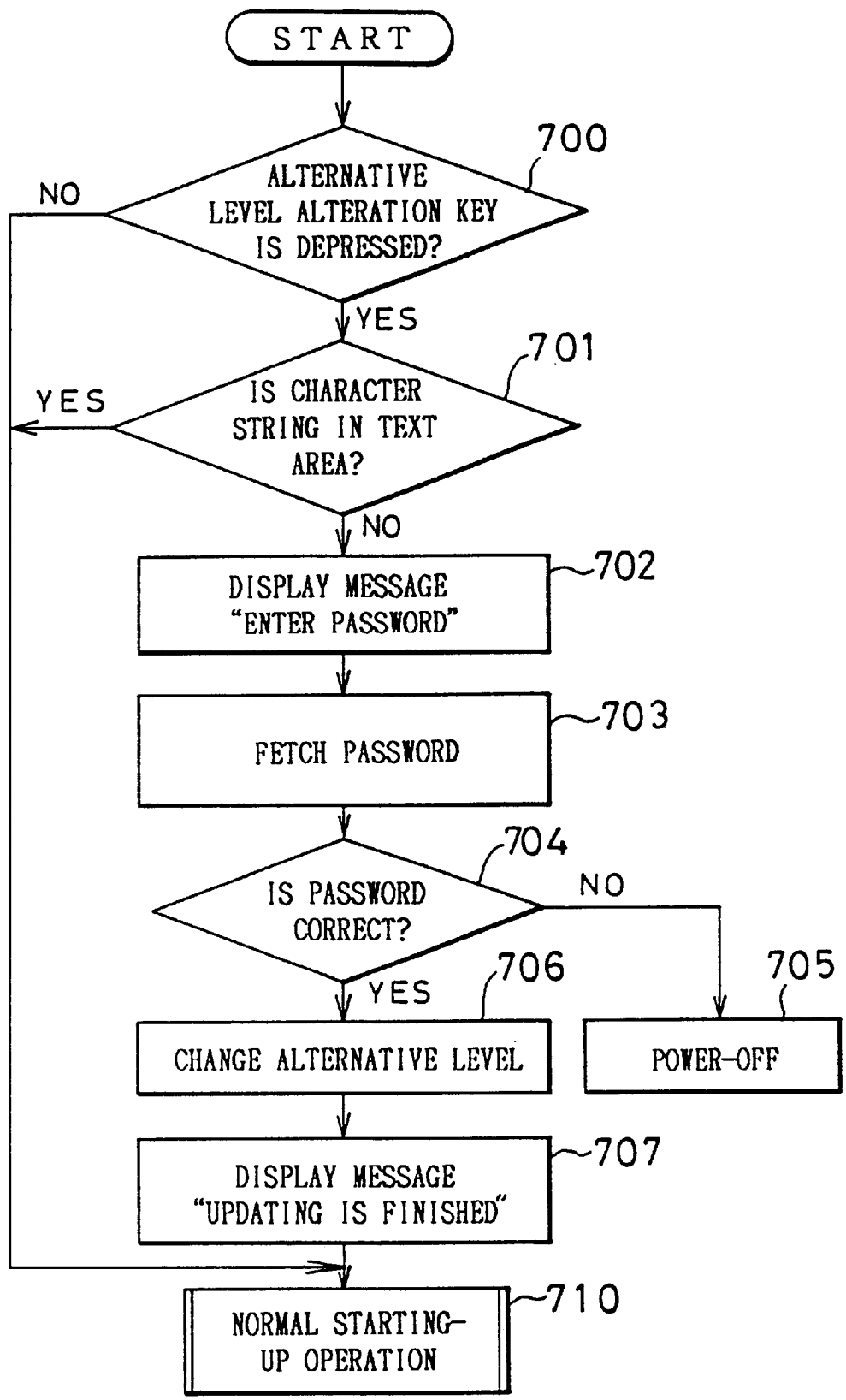
FIGS. 19(A) and 19(B) are flowcharts for illustrating an operation of selecting one of choices to be performed in the embodiment of the present invention.

Next, an operation at power-on will be described in detail hereunder by referring to FIG. 19(A).

In the case of this embodiment, a designated alternative level can be changed by turning on the power by depressing a power key when an alternative level alteration key is pushed at power-off. When the power is turned on and moreover, stable power comes to be supplied to the CPU 21, the CPU 21 starts executing a processing program of FIG. 19(A).

Namely, the CPU 21 judges in step 700 whether or not the alternative level alteration key is depressed. If not depressed, the CPU 21 advances to step 710 whereupon a normal starting-up operation at power-on is performed. For example, the name of the device, a currently employed method for inputting characters (such as a Roman-letter inputting method and a hiragana-character inputting method) and a currently designated alternative level are displayed on the screen of the LCD for a predetermined period of time. Thereafter, the character input screen is displayed thereon.

If the alternative level alteration key is depressed, the CPU 21 judges in step 701 whether there is a character string (or a text) still in the text area of the RAM 23 which has been backed up even at power-off. If still present therein, the CPU 21 advances to step 710 whereupon the normal starting-up operation at power-on is performed.

In the case of this embodiment, it is not clear whether a user wishes to apply the alternative level designated before changed or an alternative level designated after changed to the character string (or the text) left in the text area. Moreover, in the case of allowing the device to apply the alternative level, which is designated after changed, to the character string (or the text) left in the text area, it sometimes becomes necessary to perform a regulation concerning the alternatives having been already selected. Thus, the alteration of the option level is permitted only when no character string (or text) is present in the text area. Therefore, in the case that a user wishes to change the alternative level, a user should perform the following process. Namely, all of character strings are first deleted or erased. Then, the power is turned off tentatively. Thereafter, the user should perform a power-on operation which includes an operation of depressing the alternative level alteration key.

In contrast, if no character strings are present in the text area, the CPU 21 causes the LCD 35 in step 702 to display a message prompting a user to enter a password. Then, in step 703, the CPU 21 fetches a password inputted from the key entry portion 11. Subsequently, in step 704, the CPU 21 compares the inputted password with a password stored in, for example, the ROM 22 so as to judge whether the inputted password is correct.

If not correct, the CPU 21 powers down the device in step 705. Namely, the device is returned to a situation in which the operation of changing the designated alternative level is started all over again. Although the normal starting-up operation may be commenced by maintaining the existing alternative level even if the inputted password is not correct, the user, however, has once started the operation of changing the designated alternative level. Thus the device is adapted to power-down so that the user can perform the operation of changing the designated alternative level again.

In contrast, if the inputted password is correct, the CPU 21 changes the currently designated alternative level into another new alternative level in step 706. Then, the CPU 21 causes a preservation buffer (to be described later) to store the new alternative level. Subsequently, the CPU 21 causes the LCD 353 in step 707 to display a message, which indicates that the operation of changing the designated alternative level is finished, for a predetermined period of time. Thereafter, the CPU 21 advances to step 710 whereupon the normal starting-up operation at power-on is performed.

Each time when the process described hereinabove is performed, the designated alternative level varies between "Level 1" and "Level 2".

Here, the reason why the alteration key and a power key are depressed almost at the same time for the purpose of changing the designated alternative level is as follows. Namely, the designated alternative level should be prevented from being changed wrongly or carelessly. Consequently, a user can be prevented from being confused with various operations owing to the wrong change of the designated alternative level. Thus, the device is adapted to accept an instruction to change the designated alternative level only when a user clearly intends to instruct the device to do so. Incidentally, the designated alternative level is factory-configured to "Level 1", the number of alternatives corresponding to which is relatively small.

The designated alternative level is stored in the (designated-alternative-level) preservation buffer provided in the RAM 23 and a text attribute storage region contained in the text area which is provided in the RAM 23. The designated alternative level stored in the preservation buffer is applied in common to each of newly inputted texts. On the other hand, the designated alternative level stored in the text attribute storage region corresponds to a text corresponding to the text attribute storage region. Generally, the designated alternative stored in the preservation buffer is the same as that stored in the text attribute storage region. However, these alternative levels may be different from each other in the case that a file is preserved in an external storage device and thereafter, the file is read therefrom. In such a case, higher one of these alternative levels takes first preference.
Operation of Selecting One of Alternative on Item to Be Selected Next, an operation of selecting one of alternatives according to an alternative level newly designated by performing the operation of changing the designated alternative level will be described hereinbelow by referring to a flowchart of FIG. 19(B). Incidentally, FIG. 19(B) illustrates such a selecting operation in the case of using a two-layer menu.

Figure 19B:
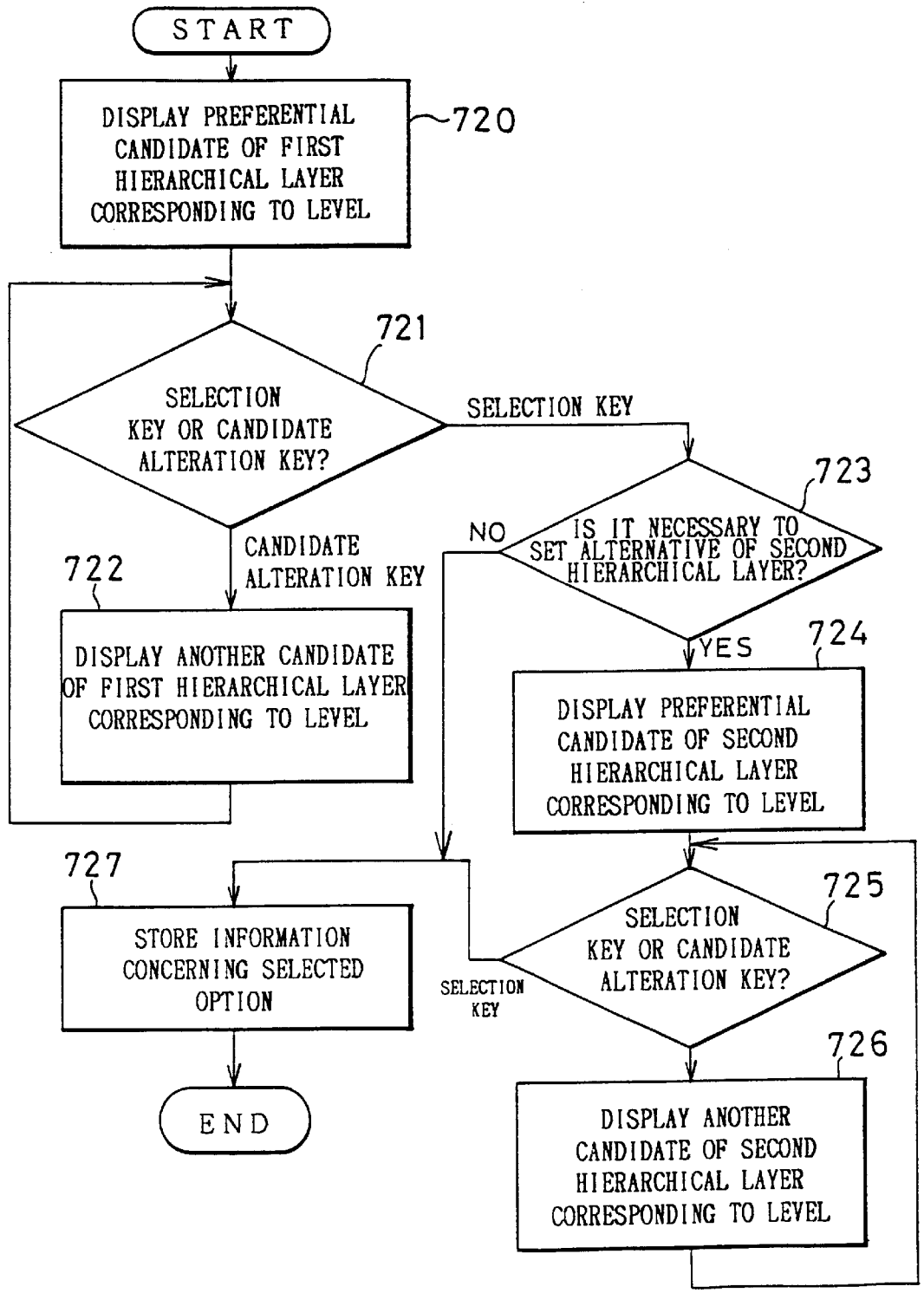

When starting the execution of a processing program of FIG. 19(B) by operating an attribute designating key or the like, the CPU 21 causes the LCD 35 in step 720 to display a preferential alternative (for example, a currently established alternative) of the first hierarchical layer corresponding to the currently designated alternative level thereon as a candidate. Thereafter, the CPU 21 judges in step 721 which of the selection key and the candidate alteration key is operated. If the candidate alteration key is operated, the CPU 21 causes the LCD 35 in step 722 to display another alternative of the first hierarchical layer corresponding to the currently designated alternative level thereon as a candidate. Then, the CPU 21 is returned to step 721.

On the other hand, if an alternative of the first hierarchical layer is definitely determined by operating the selection key, the CPU 21 judges in step 723 whether the alternative of the first hierarchical layer needs the selection of an alternative of the second hierarchical layer. If there are corresponding alternatives of the second hierarchical layer and one of the corresponding alternatives should be selected, the CPU causes the LCD 35 in step 724 to display a preferential one (for instance, a currently set one) of the corresponding alternatives of the second hierarchical layer on the screen thereof as a candidate. Thereafter, the CPU 21 judges in step 725 which of the selection key and the candidate alteration key is operated. If the candidate alteration key is operated, the CPU 21 causes the LCD 35 in step 726 to display another corresponding alternative of the second hierarchical layer, which further corresponds to the currently designated alternative level, on the screen thereof. Then, the CPU 21 is returned to the key judgement step 724.

If the established alternative of the first hierarchical layer does not need the selection of one of the corresponding alternatives of the second hierarchical layer, or if such selection of one of the corresponding alternatives of the second hierarchical layer is finished, the CPU 21 causes the text area in step 727 to store information concerning the selected alternative, which is stored in a working area for the processing program, therein by being accompanied by a text stored therein. Thus the CPU 21 finishes a sequence of the steps of this operation.

In the cases of employing a single-layer menu and a three-layer menu, operations similar to that of FIG. 19(B) are performed. Thereby, alternatives of each of the hierarchical layers corresponding to the designated alternative level are set.

In the case of the aforementioned (first) embodiment, an alternative level is assigned to each of the alternatives. Further, only alternatives, to which the alternative level designated by a user, are employed as candidates for the selection. Thereby, a character information processor, which has good operability and can easily fulfill both of a user request for the operability and a request for the degree of freedom of the contents of a produced label, can be realized.

For example, when a user makes a label of a simple structure, operations of designating various kinds of attributes can be easily achieved by designating "Level 1". In contrast, when a user makes a label of an elaborate structure, such a label can be freely made by designating "Level 2" without being under restrictions due to the selection of attributes.

Although the modifications of the first embodiment (namely, the embodiments other than the first embodiment) have been described in the foregoing description, other embodiments will be further cited as follows.

The first embodiment has two alternative levels. Another embodiment may have three or more alternative levels. In such a case, a password may be established corresponding to each of the alternative levels.

Further, in the case of the first embodiment, the designated alternative level can be changed only just after turning on the power. However, in the case of still another embodiment, the designated alternative level may be changed at a time other than the time when the power is turned on.

Moreover, in the case of the first embodiment, the alteration of the designated alternative level is permitted in a state in which all of character strings are erased. However, in the case of yet another embodiment, the alteration of the designated alternative level may be permitted in a state in which a character string is still left in the text area. In this case, it is preferable that various alternatives on existing character strings are automatically changed according to a newly designated alternative level by providing an alteration table between a group of alternatives corresponding to "Level 1" and another group of alternatives corresponding to "Level 2". For instance, when the designated alternative level is changed from "Level 2" to "Level 1", the selection of the alternative "MIRROR IMAGE CHARACTER" may be canceled.

Furthermore, in the case of the first embodiment, alternatives permitted correspondingly to each of the alternative levels are invariably held by the device. However, in the case of a further embodiment, the correspondence relation between each alternative level and a group of alternatives permitted correspondingly thereto may be freely set or modified by a user. Namely, the contents of the column "KIND" of FIGS. 18(A) to 18(D) may be rewritten by a user. For example, the contents of the column "KIND" of FIGS. 18(A) to 18(D) may be rewritten by providing a processing program of modifying individual alternative level in the device, and by then displaying all alternatives and kind-of-alternative information corresponding to the alternatives in order, and by next modifying the kind-of-alternative information and by subsequently rewriting the contents of the kind-of-alternative information of FIGS. 18(A) to 18(D) according to the modified values or contents of the kind-of-alternative information.

Additionally, in the case of the first embodiment, the procedure, by which the designated alternative level is changed from "Level 1" to "Level 2", is similar to the procedure, by which the designated alternative level is changed from "Level 2" to "Level 1". However, in the case of another embodiment, these procedures may be different from each other. For instance, the alteration of the designated alternative level from "Level 2" to "Level 1", by which the number of alternatives is reduced, may be performed by a simple step such as the depression of a return key or the like.

In addition, the items, the number of the selectable alternatives corresponding to each of which can be changed according to the designated alternative level, are not limited to those employed in the first embodiment. For example, the kind of symbols, which should be displayed when entering symbols, may be made to correspond to the alternative levels.

Incidentally, in the case of the first embodiment, the present invention is applied to the tape printing device. The present invention, however, is applied to other character information processors, each of which employs many options on the attributes for exerting the printing effects. For example, the present invention can be applied to a seal making device.

Although the preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A character information processor for printing one or more lines of input characters on a printing medium comprising:

half-size fetching means for taking in a space, which is input by keying similarly as an ordinary character, as a half-size space to be treated as a space of a width, which is half of the width of the ordinary character; and print control means for controlling a printing operation by securing a space of a width, which is half of the width of the ordinary character, in a character string to be printed when the character string contains a half-size space.

2. The character information processor according to claim 1, which further comprises full-size space fetching means for taking in a space input for adjusting a position of a character of a character string of a lower line to a position of a character of a character string of a higher line as a full size space to be treated as a space of a width equal to a width of a character, wherein the print control means controls a printing operation by securing a space of a width equal to a width of a character in a character string to be printed when the character string contains a full size space.

3. The character information processor according to claim 2, wherein said full-size space fetching means comprises:

storage means for storing a full-size space as a symbol, together with predetermined kinds of symbols; and selectively inputting means for selecting one of the symbols stored in the storage means and for providing an instruction to input the selected one of the symbols, wherein when the selectively inputting means provides an instruction to select and input a full-size space, the full-size space fetching means takes in the selected full-size space.

4. The character information processor according to claim 2, which further comprises space display control means for displaying a half-size space in a width equal to the width of a character when the half-size space is contained in an input character string, and for displaying a full-size space in a width equal to the width of a character and in a manner different from a manner in which a half-size space is displayed, when the half-size is contained in an input character string.

5. The character information processor according to claim 3, which further comprises space display control means for displaying a half-size space in a width equal to the width of a character when the half-size space is contained in an input character string, and for displaying a full-size space in a width equal to the width of a character and in a manner different from a manner in which a half-size space is displayed, when the half-size is contained in an input character string.

6. A character information processing and printing method comprising:

inputting one or more lines of input characters to be printed on a printing medium;

said inputting including fetching of a half-size space by keying similarly as an ordinary character wherein the width of the half-size space is half of the width of an ordinary character; and printing the one or more lines of input characters including controlling a printing operation in response to the half-size space to provide a space which has a width half of the width of the ordinary character when the one or more lines of input characters contain a half-size space.

7. A character information processor for printing one or more lines of input characters on a printing medium comprising:

an entry portion for manually entering successive characters forming a character string including the selecting of a space similarly as an ordinary character but wherein the space has a width which is half of the width of an ordinary character; and a print controller for controlling a printing operation to print the character string on the printing medium including the forming of a space which is half of a size of the ordinary character in response to the half-size space during printing of in the character string.

8. The character information processor according to claim 2, wherein the each of the full-size space and the half-size space include leading and trailing character separation spaces, and, when one of the full-size and half-size space is input as a head or tail of a character string, the corresponding leading or trailing character separation is omitted by the print control means.

9. The character information processor according to claim 7, which further comprises full-size space fetching means for taking in a space input for adjusting a position of a character of a character string of a lower line to a position of a character of a character string of a higher line as a full size space to be treated as a space of a width equal to a width of a character, and wherein the print controller controls a printing operation by securing a space of a width equal to a width of a character in a character string to be printed when the character string contains a full size space.

10. The character information processor according to claim 9, wherein the each of the full-size space and the half-size space include leading and trailing character separation spaces, and, when one of the full-size and half-size space is input as a head or tail of a character string, the corresponding leading or trailing character separation is omitted by the print controller.

\* \* \* \* \*

UNITED STATES PATENT AND TRADEMARK OFFICE
CERTIFICATE OF CORRECTION

PATENT NO. : 5,926,618
DATED : July 20, 1999
INVENTOR(S) : WATANABE et al

It is certified that error appears in the above-indentified patent and that said Letters Patent is hereby corrected as shown below:

Title page,

Insert:

--[30] Foreign Application Priority Data

Dec. 7, 1994 [JP]    Japan ............ 6-303356
Dec. 7, 1994 [JP]    Japan ............ 6-303357
Dec. 7, 1994 [JP]    Japan ............ 6-303667
Dec. 7, 1994 [JP]    Japan ............ 6-303669--.

Col. 1, line 5, delete "is now Ser.";
       line 6, delete "No. 08/831,217 filed Apr. 2, 1997".

Col. 7, line 9, delete "edition" and insert --editing--;
       line 10, delete "edition" and insert --editing--;
       line 11, delete "edition" and insert --editing--;
       line 12, delete "edition" and insert --editing--;
       line 14, delete "edition" and insert --editing--, both instances;
       line 17, delete "edition" and insert --editing--;
       line 33, delete "edition" and insert --editing--; and
       line 38, delete "edition" and insert --editing--.

UNITED STATES PATENT AND TRADEMARK OFFICE
CERTIFICATE OF CORRECTION

PATENT NO. : 5,926,618
DATED : July 20, 1999
INVENTOR(S) : WATANABE et al

It is certified that error appears in the above-indentified patent and that said Letters Patent is hereby corrected as shown below:

Col. 8, line 49, delete "edition" and insert --editing--; and line 51, delete "edition" and insert --editing--.

Col. 12, line 59, delete "edition" and insert --editing--.

Col. 14, line 63, delete "121" and insert --21--.

Col. 22, line 59, after "of" insert --a--.

Col. 27, line 58, before "character" insert --a--.

Col. 29, line 21, after "If" insert --it--.

UNITED STATES PATENT AND TRADEMARK OFFICE
CERTIFICATE OF CORRECTION

PATENT NO. : 5,926,618
DATED : July 20, 1999
INVENTOR(S) : Watanabe, et. al.

It is certified that error appears in the above-identified patent and that said Letters Patent is hereby corrected as shown below:

Col. 36, line 55, delete "half-size" insert --full-size space--; and
line 64, delete "half-size" insert --full-size space--.

Col. 37, line 25, delete "in".

Signed and Sealed this

Twenty-seventh Day of June, 2000

Attest:

Q. TODD DICKINSON

*Attesting Officer*    *Director of Patents and Trademarks*